(12) United States Patent
Tarvydas et al.

(10) Patent No.: US 8,676,665 B2
(45) Date of Patent: *Mar. 18, 2014

(54) METHOD AND MEDIUM FOR UNIVERSAL SHOPPING CART ORDER INJECTION AND PAYMENT DETERMINATION

(75) Inventors: Martin K. Tarvydas, Bellevue, WA (US); Mark I. Sandori, Bellevue, WA (US); Eric S. Maple, Browns Point, WA (US); Timothy P. Byerly, Mercer Island, WA (US); Matthew A. Markus, LeGrange, IL (US)

(73) Assignee: Zanni Assets Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,517

(22) Filed: Oct. 11, 2011

(65) Prior Publication Data

US 2012/0030065 A1 Feb. 2, 2012

Related U.S. Application Data

(60) Continuation of application No. 13/035,690, filed on Feb. 25, 2011, now Pat. No. 8,065,195, which is a continuation of application No. 12/902,099, filed on Oct. 11, 2010, now Pat. No. 7,925,544, which is a continuation of application No. 12/504,486, filed on Jul. 16, 2009, now Pat. No. 7,835,949, which is a continuation of application No. 11/841,412, filed on Aug. 20, 2007, now Pat. No. 7,577,592, which is a division of application No. 11/163,707, filed on Oct. 27, 2005, now Pat. No. 7,328,176, which is a division of application No. 09/880,723, filed on Jun. 12, 2001, now Pat. No. 7,305,355.

(60) Provisional application No. 60/210,987, filed on Jun. 12, 2000.

(51) Int. Cl.
*G06Q 30/00* (2012.01)

(52) U.S. Cl.
USPC .................................................. 705/26.41

(58) Field of Classification Search
USPC ........................ 705/26.1, 27.1, 26.41
See application file for complete search history.

(56) References Cited

U.S. PATENT DOCUMENTS 5,450,537 A 9/1995 Hirai et al.
(Continued)

FOREIGN PATENT DOCUMENTS

WO 9804976 2/1998
WO 0031657 6/2000

OTHER PUBLICATIONS

Ebay's Feedback FAQ—Archive.org Nov. 12, 1999—http://web.archive.org/web/19991122070012/http://pages.ebay.com/services/forum/feedback.html.*

(Continued)

*Primary Examiner* — Matthew Zimmerman
(74) *Attorney, Agent, or Firm* — Brundidge & Stanger, P.C.

(57) ABSTRACT

A universal shopping cart is provided that obtains and orders products and services from different merchants located on the Internet. The consumer completes all of their shopping on the shopping site and is not directed to another merchant's site to complete an order. The universal shopping cart provides a monitoring service that allows the consumer to monitor a product for specified criteria. The order injection system places orders for products contained within the universal shopping cart from affiliated and non-affiliated merchants. Specific ordering details required from merchants external to the shopping site are hidden from the consumer. For external merchant sites that require a consumer account before allowing the product to be purchased, the shopping site creates a new consumer account without intervention from the consumer. Once the products are ordered, the consumer may keep track of the ordered products from the shopping site.

19 Claims, 28 Drawing Sheets

(56) References Cited

U.S. PATENT DOCUMENTS

| | | | |
|---|---|---|---|
| 5,537,586 A * | 7/1996 | Amram et al. ..................... 1/1 |
| 5,550,746 A | 8/1996 | Jacobs |
| 5,710,884 A * | 1/1998 | Dedrick ........................ 709/217 |
| 5,710,887 A | 1/1998 | Chelliah et al. |
| 5,721,940 A | 2/1998 | Luther et al. |
| 5,754,981 A * | 5/1998 | Veeneman et al. ........... 705/26.8 |
| 5,774,874 A * | 6/1998 | Veeneman et al. ........... 705/26.8 |
| 5,799,157 A * | 8/1998 | Escallon ....................... 705/26.8 |
| 5,832,100 A | 11/1998 | Lawton et al. |
| 5,844,971 A | 12/1998 | Elias et al. |
| 5,862,223 A * | 1/1999 | Walker et al. .................... 705/50 |
| 5,870,552 A | 2/1999 | Dozier et al. |
| 5,872,915 A | 2/1999 | Dykes et al. |
| 5,878,141 A * | 3/1999 | Daly et al. ....................... 705/78 |
| 5,933,778 A | 8/1999 | Bhurmann et al. |
| 5,937,064 A | 8/1999 | Eick et al. |
| 5,960,411 A | 9/1999 | Hartman et al. |
| 5,966,697 A | 10/1999 | Fergerson et al. |
| 5,970,474 A | 10/1999 | LeRoy et al. |
| 5,987,440 A | 11/1999 | O'Neil et al. |
| 5,995,756 A | 11/1999 | Hermann |
| 6,023,683 A | 2/2000 | Johnson et al. |
| 6,029,141 A | 2/2000 | Bezos et al. |
| 6,035,276 A | 3/2000 | Newman et al. |
| 6,055,516 A | 4/2000 | Johnson et al. |
| 6,064,382 A | 5/2000 | Diedrich et al. |
| 6,083,279 A | 7/2000 | Cuomo et al. |
| 6,088,700 A | 7/2000 | Larsen et al. |
| 6,101,482 A | 8/2000 | DiAngelo et al. |
| 6,125,353 A | 9/2000 | Yagasaki |
| 6,182,127 B1 | 1/2001 | Cronin, III et al. |
| 6,192,380 B1 | 2/2001 | Light et al. |
| 6,192,381 B1 | 2/2001 | Stiegemeier et al. |
| 6,193,152 B1 | 2/2001 | Fernando et al. |
| 6,199,079 B1 | 3/2001 | Gupta et al. |
| 6,208,339 B1 | 3/2001 | Atlas et al. |
| 6,256,623 B1 | 7/2001 | Jones |
| 6,320,952 B1 | 11/2001 | Bruno et al. |
| 6,327,598 B1 | 12/2001 | Kelley et al. |
| 6,334,114 B1 | 12/2001 | Jacobs et al. |
| 6,345,256 B1 | 2/2002 | Milsted et al. |
| 6,345,278 B1 | 2/2002 | Hitchcock et al. |
| 6,360,205 B1 | 3/2002 | Iyengar et al. |
| 6,381,597 B1 * | 4/2002 | Lin ............................... 707/707 |
| 6,409,592 B1 | 6/2002 | McCoy et al. |
| 6,490,601 B1 | 12/2002 | Markus et al. |
| 6,490,602 B1 | 12/2002 | Kraemer |
| 6,496,855 B1 | 12/2002 | Hunt et al. |
| 6,499,042 B1 | 12/2002 | Markus |
| 6,499,052 B1 | 12/2002 | Hoang et al. |
| 6,505,172 B1 | 1/2003 | Johnson et al. |
| 6,505,230 B1 | 1/2003 | Mohan et al. |
| 6,510,459 B2 | 1/2003 | Cronin, III et al. |
| 6,535,880 B1 | 3/2003 | Musgrove et al. |
| 6,571,214 B2 | 5/2003 | Newman et al. |
| 6,578,011 B1 | 6/2003 | Forward |
| 6,589,290 B1 | 7/2003 | Maxwell et al. |
| 6,594,644 B1 | 7/2003 | Van Dusen |
| 6,629,079 B1 * | 9/2003 | Spiegel et al. ................ 705/26.7 |
| 6,629,135 B1 * | 9/2003 | Ross et al. ..................... 709/218 |
| 6,643,624 B2 * | 11/2003 | Philippe et al. .............. 705/26.8 |
| 6,651,217 B1 | 11/2003 | Kennedy et al. |
| 6,662,340 B2 | 12/2003 | Rawat et al. |
| 6,704,906 B1 | 3/2004 | Yankovich et al. |
| 6,725,222 B1 * | 4/2004 | Musgrove et al. ........... 705/26.5 |
| 6,772,139 B1 | 8/2004 | Smith, III |
| 6,785,671 B1 * | 8/2004 | Bailey et al. ............... 705/26.81 |
| 6,820,204 B1 | 11/2004 | Desai et al. |
| 6,842,737 B1 | 1/2005 | Stiles et al. |
| 6,856,963 B1 | 2/2005 | Hurwitz |
| 6,879,960 B2 | 4/2005 | Nascenzi et al. |
| 6,892,185 B1 | 5/2005 | Van Etten et al. |
| 6,895,388 B1 | 5/2005 | Smith |
| 6,944,669 B1 | 9/2005 | Saccocio |
| 6,959,414 B1 | 10/2005 | Kakehashi |
| 7,006,993 B1 | 2/2006 | Cheong et al. |
| 7,047,211 B1 | 5/2006 | Van Etten et al. |
| 7,051,273 B1 | 5/2006 | Holt et al. |
| 7,058,598 B1 | 6/2006 | Chen et al. |
| 7,107,226 B1 * | 9/2006 | Cassidy et al. ............... 705/26.8 |
| 7,174,342 B1 | 2/2007 | Scheurich et al. |
| 7,185,069 B2 | 2/2007 | Costin et al. |
| 7,197,475 B1 * | 3/2007 | Lorenzen et al. .......... 705/26.81 |
| 7,305,355 B2 * | 12/2007 | Tarvydas et al. ........... 705/26.43 |
| 7,328,176 B2 * | 2/2008 | Tarvydas et al. ........... 705/26.62 |
| 7,330,826 B1 * | 2/2008 | Porat et al. ................... 705/26.3 |
| 7,334,184 B1 | 2/2008 | Simons |
| 7,373,314 B2 | 5/2008 | Aliabadi et al. |
| 7,412,409 B2 | 8/2008 | Aliabadi et al. |
| 7,552,365 B1 | 6/2009 | Marsh et al. |
| 7,577,592 B2 * | 8/2009 | Tarvydas et al. ........... 705/26.81 |
| 7,577,593 B2 * | 8/2009 | Tarvydas et al. ........... 705/26.81 |
| 7,577,594 B2 * | 8/2009 | Tarvydas et al. ........... 705/26.81 |
| 7,580,869 B2 * | 8/2009 | Tarvydas et al. ........... 705/26.35 |
| 2001/0011250 A1 | 8/2001 | Paltenghe et al. |
| 2001/0016828 A1 | 8/2001 | Philippe et al. |
| 2001/0032094 A1 | 10/2001 | Ghosh et al. |
| 2002/0002496 A1 | 1/2002 | Miller et al. |
| 2002/0004735 A1 | 1/2002 | Gross |
| 2002/0013788 A1 | 1/2002 | Pennell et al. |
| 2002/0038255 A1 | 3/2002 | Tarvydas et al. |
| 2002/0065737 A1 | 5/2002 | Aliabadi et al. |
| 2002/0087496 A1 | 7/2002 | Stirpe et al. |
| 2002/0108057 A1 | 8/2002 | Zhanhong Wu et al. |
| 2002/0120474 A1 | 8/2002 | Hele et al. |
| 2002/0161605 A1 | 10/2002 | Newman et al. |
| 2002/0174018 A1 | 11/2002 | Bunger et al. |
| 2002/0178122 A1 * | 11/2002 | Maes ............................... 705/64 |
| 2002/0194125 A1 | 12/2002 | Shimada |
| 2003/0028792 A1 | 2/2003 | Plow et al. |
| 2003/0050855 A1 | 3/2003 | Jaffe et al. |
| 2003/0065721 A1 | 4/2003 | Roskind |
| 2003/0093321 A1 | 5/2003 | Bodmer et al. |
| 2003/0140312 A1 | 7/2003 | Mohan et al. |
| 2004/0019536 A1 | 1/2004 | Ashkenazi et al. |
| 2004/0039988 A1 | 2/2004 | Lee et al. |
| 2004/0064351 A1 | 4/2004 | Mikurak |
| 2004/0205525 A1 | 10/2004 | Murren et al. |
| 2004/0205526 A1 | 10/2004 | Borodovski et al. |
| 2004/0205530 A1 | 10/2004 | Borg |
| 2004/0267674 A1 | 12/2004 | Feng et al. |
| 2005/0027611 A1 * | 2/2005 | Wharton ........................ 705/26 |
| 2005/0044423 A1 | 2/2005 | Mellmer et al. |
| 2005/0273396 A1 | 12/2005 | Aliabadi et al. |
| 2006/0000900 A1 | 1/2006 | Fernandes et al. |
| 2006/0041485 A1 | 2/2006 | Tarvydas et al. |
| 2006/0178918 A1 | 8/2006 | Mikurak |
| 2008/0033834 A1 | 2/2008 | Tarvydas et al. |
| 2008/0033839 A1 | 2/2008 | Tarvydas et al. |
| 2008/0046337 A1 | 2/2008 | Tarvydas et al. |
| 2008/0046338 A1 | 2/2008 | Tarvydas et al. |
| 2008/0162298 A1 | 7/2008 | Aliabadi et al. |
| 2008/0306835 A1 | 12/2008 | Agura et al. |
| 2009/0281890 A1 | 11/2009 | Aliabadi et al. |
| 2009/0281914 A1 | 11/2009 | Tarvydas et al. |
| 2009/0281927 A1 | 11/2009 | Aliabadi et al. |
| 2011/0035293 A1 | 2/2011 | Tarvydas et al. |

OTHER PUBLICATIONS

Don't Check Out Without Them—Desktop Shopping Agents, O'Brien, Jim Computer Shopper, p. 85, Mar. 2000.*

USPTO; Final Office Action dated Jan. 19, 2007 in U.S. Appl. No. 09/880,723.

USPTO; Advisory Action dated Mar. 23, 2007 in U.S. Appl. No. 09/880,723.

USPTO; Notice of Allowance dated Sep. 17, 2007 in U.S. Appl. No. 09/880,723.

USPTO; Office Action Restriction dated Jan. 10, 2006 in U.S. Appl. No. 11/163,707.

USPTO; Office Action dated Apr. 13, 2006 in U.S. Appl. No. 11/163,707.

USPTO; Office Action dated Sep. 26, 2006 in U.S. Appl. No. 11/163,707.

(56) References Cited

OTHER PUBLICATIONS

USPTO; Final Office Action dated Apr. 26, 2007 in U.S. Appl. No. 11/163,707.
USPTO; Advisory Action dated Jun. 26, 2007 in U.S. Appl. No. 11/163,707.
USPTO; Notice of Allowance dated Nov. 8, 2007 in U.S. Appl. No. 11/163,707.
USPTO; Office Action dated Jul. 24, 2008 in U.S. Appl. No. 11/841,367.
USPTO; Final Office Action dated Feb. 24, 2009 in U.S. Appl. No. 11/841,367.
USPTO; Advisory Action dated Mar. 26, 2009 in U.S. Appl. No. 11/841,367.
USPTO; Notice of Allowance dated Jul. 13, 2009 in U.S. Appl. No. 11/841,367.
USPTO; Office Action dated Jul. 25, 2008 in U.S. Appl. No. 11/841,412.
USPTO; Final Office Action dated Jan. 8, 2009 in U.S. Appl. No. 11/841,412.
USPTO; Advisory Action dated Mar. 26, 2009 in U.S. Appl. No. 11/841,412.
USPTO; Notice of Allowance dated Jul. 7, 2009 in U.S. Appl. No. 11/841,412.
USPTO; Office Action dated Aug. 7, 2008 in U.S. Appl. No. 11/841,448.
USPTO; Final Office Action dated Jan. 8, 2009 in U.S. Appl. No. 11/841,448.
USPTO; Advisory Action dated Mar. 26, 2009 in U.S. Appl. No. 11/841,448.
USPTO; Notice of Allowance dated Jul. 7, 2009 in U.S. Appl. No. 11/841,448.
USPTO; Office Action dated Aug. 6, 2008 in U.S. Appl. No. 11/841,484.
USPTO; Final Office Action dated Jan. 7, 2009 in U.S. Appl. No. 11/841,484.
USPTO; Advisory Action dated Mar. 26, 2009 in U.S. Appl. No. 11/841,484.
USPTO; Notice of Allowance dated Jul. 7, 2009 in U.S. Appl. No. 11/841,484.
USPTO; Notice of Allowance dated Jul. 12, 2010 in U.S. Appl. No. 12/504,486.
USPTO; Notice of Allowance dated Feb. 22, 2011 in U.S. Appl. No. 12/902,099.
USPTO; Office Action dated Oct. 6, 2010 in U.S. Appl. No. 12/708,297.
USPTO; Final Office Action dated Dec. 14, 2010 in U.S. Appl. No. 12/708,297.
USPTO; Advisory Action dated Feb. 24, 2011 in U.S. Appl. No. 12/708,297.
USPTO; Office Action dated Apr. 12, 2011 in U.S. Appl. No. 12/708,297.
USPTO; Final Office Action dated Aug. 19, 2011 in U.S. Appl. No. 12/708,297.
USPTO; Advisory Action dated Nov. 4, 2011 in U.S. Appl. No. 12/708,297.
USPTO; Notice of Allowance dated Jul. 1, 2011 in U.S. Appl. No. 13/035,690.
USPTO; Office Action dated Sep. 17, 2010 in U.S. Appl. No. 11/860,645.
USPTO; Final Office Action dated Dec. 9, 2010 in U.S. Appl. No. 11/860,645.
USPTO; Advisory Action dated Mar. 2, 2011 in U.S. Appl. No. 11/860,645.
USPTO; Office Action dated Nov. 25, 2011 in U.S. Appl. No. 11/860,645.
USPTO; Office Action dated Sep. 2, 2011 in U.S. Appl. No. 11/940,149.
USPTO; Office Action dated Oct. 6, 2010 in U.S. Appl. No. 12/128,587.
USPTO; Final Office Action dated Jan. 27, 2011 in U.S. Appl. No. 12/128,587.
USPTO; Advisory Action dated Apr. 1, 2011 in U.S. Appl. No. 12/128,587.
USPTO; Office Action dated Jun. 13, 2011 in U.S. Appl. No. 12/128,587.
USPTO; Final Office Action dated Nov. 25, 2011 in U.S. Appl. No. 12/128,587.
Lauri Giesen, "Online Shopping: How Will Consumers Pay?" Financial Service Online, vol. 4, No. 9, P. 38, Oct. 1999.
Preddy, M., "Mall of Michigan Debuts on Internet in May," Detroit News, p. B1, Apr. 18, 1997.
O'Brien, Jim, Don't Check Out Without Them—Desktop Shopping Agents, Computer Shopper, p. 85, Mar. 2000.
Lemay, Laura; Java 1.1: Interactive Course, 1997, The Waite Group.
Cozzens, Lisa; JavaScript Tutorial, http://www.cs.brown.edu/courses/bridge/1998/res/javascript-tutorial.html, 1998.
Printout of Website for "About eWallet," http://222.ewallet.com, Jan. 11, 1999, 4 pages.
USPTO; Office Action dated May 12, 2004 in U.S. Appl. No. 09/882,368.
USPTO; Final Office Action dated Aug. 30, 2004 in U.S. Appl. No. 09/882,368.
USPTO; Advisory Action dated Nov. 9, 2004 in U.S. Appl. No. 09/882,368.
USPTO; Office Action dated Nov. 29, 2004 in U.S. Appl. No. 09/882,368.
USPTO; Final Office Action dated Jun. 9, 2005 in U.S. Appl. No. 09/882,368.
USPTO; Advisory Action dated Aug. 31, 2005 in U.S. Appl. No. 09/882,368.
USPTO; Office Action dated Dec. 5, 2005 in U.S. Appl. No. 09/882,368.
USPTO; Office Action dated Apr. 24, 2006 in U.S. Appl. No. 09/882,368.
USPTO; Final Office Action dated Oct. 24, 2006 in U.S. Appl. No. 09/882,368.
USPTO; Advisory Action dated Dec. 27, 2006 in U.S. Appl. No. 09/882,368.
USPTO; Office Action dated Apr. 2, 2007 in U.S. Appl. No. 09/882,368.
USPTO; Office Action dated Aug. 30, 2007 in U.S. Appl. No. 09/882,368.
USPTO; Notice of Allowance dated Dec. 12, 2007 in U.S. Appl. No. 09/882,368.
USPTO; Office Action dated Jan. 20, 2004 in U.S. Appl. No. 09/595,622.
USPTO; Final Office Action dated Dec. 30, 2004 in U.S. Appl. No. 09/595,622.
USPTO; Office Action dated Apr. 19, 2005 in U.S. Appl. No. 09/595,622.
USPTO; Final Office Action dated Aug. 24, 2005 in U.S. Appl. No. 09/595,622.
USPTO; Advisory Action dated Oct. 5, 2005 in U.S. Appl. No. 09/595,622.
USPTO; Office Action dated Dec. 8, 2005 in U.S. Appl. No. 09/595,622.
USPTO; Final Office Action dated Jun. 1, 2006 in U.S. Appl. No. 09/595,622.
USPTO; Advisory Action dated Aug. 14, 2006 in U.S. Appl. No. 09/595,622.
USPTO; Office Action dated Aug. 31, 2006 in U.S. Appl. No. 09/595,622.
USPTO; Final Office Action dated Apr. 11, 2007 in U.S. Appl. No. 09/595,622.
USPTO; Advisory Action dated Jul. 24, 2007 in U.S. Appl. No. 09/595,622.
USPTO; Notice of Allowance dated Sep. 12, 2007 in U.S. Appl. No. 09/595,622.
USPTO; Office Action dated Jul. 9, 2003 in U.S. Appl. No. 09/523,410.
USPTO; Final Office Action dated Jul. 8, 2005 in U.S. Appl. No. 09/523,410.

(56) References Cited

OTHER PUBLICATIONS

USPTO; Advisory Action dated Sep. 1, 2005 in U.S. Appl. No. 09/523,410.
USPTO; Office Action dated Nov. 28, 2005 in U.S. Appl. No. 09/523,410.
USPTO; Final Office Action dated May 15, 2006 in U.S. Appl. No. 09/523,410.
USPTO; Advisory Action dated Aug. 8, 2006 in U.S. Appl. No. 09/523,410.
USPTO; Office Action dated Oct. 5, 2006 in U.S. Appl. No. 09/523,410.
USPTO; Notice of Allowance dated Nov. 19, 2007 in U.S. Appl. No. 09/523,410.
USPTO; Office Action dated Nov. 17, 2005 in U.S. Appl. No. 11/125,593.
USPTO; Final Office Action dated Apr. 26, 2006 in U.S. Appl. No. 11/125,593.
USPTO; Advisory Action dated Jul. 20, 2006 in U.S. Appl. No. 11/125,593.
USPTO; Office Action dated Oct. 6, 2006 in U.S. Appl. No. 11/125,593.
USPTO; Final Office Action dated Apr. 30, 2007 in U.S. Appl. No. 11/125,593.
USPTO; Advisory Action dated Aug. 8, 2007 in U.S. Appl. No. 11/125,593.
USPTO; Office Action dated Nov. 19, 2007 in U.S. Appl. No. 11/125,593.
USPTO; Notice of Allowance dated May 21, 2008 in U.S. Appl. No. 11/125,593.
USPTO; Office Action dated May 7, 2004 in U.S. Appl. No. 09/880,723.
USPTO; Final Office Action dated Oct. 22, 2004 in U.S. Appl. No. 09/880,723.
USPTO; Advisory Action dated Jan. 14, 2005 in U.S. Appl. No. 09/880,723.
USPTO; Office Action dated Feb. 28, 2005 in U.S. Appl. No. 09/880,723.
USPTO; Final Office Action dated Jul. 22, 2005 in U.S. Appl. No. 09/880,723.
USPTO; Advisory Action dated Sep. 13, 2005 in U.S. Appl. No. 09/880,723.
USPTO; Office Action Restriction dated Oct. 18, 2005 in U.S. Appl. No. 09/880,723.
USPTO; Office Action dated Jan. 10, 2006 in U.S. Appl. No. 09/880,723.
USPTO; Office Action dated Jul. 20, 2006 in U.S. Appl. No. 09/880,723.
Printout for Website for Transactor networks (CitiWallet), http://www.transactor.net.com, Jan. 11, 1999, 4 pages.
"iSyndicate and InfoSpace Team to Broadly Deliver Consumer Services," PR Newswire, New York: Mar. 20, 2000, p. 1.
Sirbu, Marvin, et al., "NetBill: An Internet Commerce System Optimized for Network-Delivered Services," IEEE Personal Communications, 34-39, Aug. 1995.
Unknown: "Gator offers one-click shopping at over 5,000 e-commerce sites today," Internet Publication, origin unknown, Jan. 14, 1999.
Unknown: "E-Commerce Leaders Announce Universal Formats for Simplified Online Payments," Internet Publication, origin unknown, Jun. 14, 1999.
Cingil, "Supporting Global User Profiles Through Trusted Authorities," Data Management Issues in Electronic Commerce, vol. 31, issue 1, Mar. 2000, pp. 11-17.
Anonymous, "CDW Computer Centers: CDW Computer Centers Takes Online Shopping to the Next Level," Business Wire, May 18, 1998.
Bonisteel, S., "Company Sees One Shopping 'Basket' for Enter Web Oct. 28, 1999," Newsbytes, Oct. 28, 1999.
Anonymous, "BuyerZone.com Announces Most Advanced eCommerce System for Small to Mid-Sized Businesses," Business Wire, Dec. 13, 1999.
alexa.com screen captures via the WayBackMachine (archieve.org) and dated Feb. 29, 2000.
"SmartShop.com Simplifies the Online Shopping Experience; New Site Promises to Redefine Internet Shopping," Business Editors; Business Wire; Nov. 29, 1999.
Mukherjee, "Automating Forms Publishing with the Intelligent Filling Manager," IEEE 1999, pp. 308-313.
Bowen, Barry D., "How Popular Sites Use Cookie Technology," Netscape Enterprise Developer, Apr. 1997.
Maret, et al., "Multimedia Information Interchange: Web Forms Meet Data Services," IEEE 1999, pp. 499-505.

* cited by examiner

FIG 19

METHOD AND MEDIUM FOR UNIVERSAL SHOPPING CART ORDER INJECTION AND PAYMENT DETERMINATION

CROSS-REFERENCE TO RELATED APPLICATIONS

This invention is a continuation of and claims priority to U.S. patent application Ser. No. 13/035,690 filed on Feb. 25, 2011 and entitled "Method, Medium, And System For Universal Shopping Cart Order Injection And Payment Determination." The '690 application is a continuation of and claims priority to U.S. Pat. No. 7,925,544 issued on Apr. 12, 2011 (aka U.S. patent application Ser. No. 12/902,099 filed on Oct. 11, 2010 and entitled "Method, Medium, And System For Universal Shopping Cart Order Injection And Payment Determination"). The '544 patent is a continuation of and claims priority to U.S. Pat. No. 7,835,949 issued on Nov. 16, 2010 (aka U.S. patent application Ser. No. 12/504,486 filed on Jul. 16, 2009 and entitled "Method, Medium, And System For Universal Shopping Cart Order Injection And Payment Determination"). The '949 patent is a continuation of and claims priority to U.S. Pat. No. 7,577,592 issued on Aug. 18, 2009 and entitled "Universal Shopping Cart and Order Injection System" (aka U.S. patent application Ser. No. 11/841,412 filed on Aug. 20, 2007). The '592 patent is a divisional of and claims priority to U.S. Pat. No. 7,328,176 issued on Feb. 5, 2008 (aka U.S. patent application Ser. No. 11/163,707 filed on Oct. 27, 2005) and entitled "Universal Shopping Card and Order Injection System." The '176 patent is a divisional of and claims priority to U.S. Pat. No. 7,305,355 issued on Dec. 4, 2007 (aka U.S. patent application Ser. No. 09/880,723 filed on Jun. 12, 2001) and entitled "Universal Shopping Cart and Order Injection System." The '355 patent claims priority to Provisional Application No. 60/210,987, filed Jun. 12, 2000. The entire disclosures of the prior applications are considered as being part of the disclosure of this application and are hereby incorporated herein by reference.

FIELD OF THE INVENTION

The present invention relates to electronic commerce, and more specifically, to a method and system for providing an aggregated interface for purchasing products and/or services from disparate merchants.

BACKGROUND OF THE INVENTION

Over the last several years, the Internet has seen expansive growth in the area of electronic commerce ("e-commerce"). Today, many consumers shop over the Internet from electronic retailers ("merchants") in the privacy of their home instead of shopping from catalogs or physically going to a store. While a consumer may not be able to physically handle the products while shopping on the Internet, the consumer may be able to view pictures of the products, have textual, graphical and audio descriptions of the products, as well as read reviews of the products. For example, a merchant may create an e-commerce site on the World Wide Web (the "Web" or "WWW") that is devoted to products carried in a physical store. This product information is typically made accessible to a consumer over the Internet through Web pages created by the merchant. A problem with this approach is that consumers have to learn how to navigate through all of the different e-commerce sites where they are interested in shopping. It would therefore be desirable to have an e-commerce site where the consumer navigates in the same manner whether shopping from Merchant A or Merchant B.

Typically, merchants provide the consumer with a search engine to find products on their Web site. While this makes navigation somewhat easier than the consumer manually navigating through each Web page, there are still problems. For example, each merchant may use a different search engine having different input requirements and/or the merchant may return matches to the search made by the consumer in a different manner. What is needed is a consistent manner of inputting and returning matches to the consumer.

If the consumer locates a product in which he or she is interested, the consumer is typically allowed to purchase the product(s) at that time. For example, if the consumer is interested in purchasing Product A from the merchant, the consumer will provide appropriate information to the merchant over a secure connection in order to process the order. This information typically includes name, shipping address, billing address, payment information and desired shipping method. This information is typically entered through an input form on a Web page designed and provided by the merchant. It is also common for the merchant to require the consumer to create an account on the site of said merchant before purchasing products. If a consumer purchases items from many different sites he or she will have to keep track of many different accounts. It is desirable, therefore, to have a shopping site that enables a consumer to order products from many different merchants without requiring the consumer to keep track of all the different accounts required to purchase goods from the many different merchants.

Another e-commerce problem is that it is becoming harder for a consumer to locate products and comparison shop over the Internet. This is due to the sheer volume of merchants, products and services available to the consumer over the Internet. Today, a consumer may also use one of the commonly available search engines on the Internet to locate products. However, search engines generally return so many matches to a query that it is unrealistic for a consumer to manually inquire on each returned match. In addition, these matches also include both merchant and non-merchant Web sites making it even more difficult for a consumer to actually review all of the returned merchant sites. Further, either the Web shopping sites direct the consumer to another merchant Web site, or they place the merchant's Web site within a frame on one of their main pages. However, this approach does not provide the consumer with a consistent look and feel.

In an attempt to solve the above-mentioned problems of comparison shopping and locating products on the Internet, many different methods have been created that provide the consumer with access to many different merchant sites through one central site. For example, U.S. Pat. No. 5,895,454 to Harrington purports to describe a shopping system allowing the consumer to connect to remote Web sites whereupon the consumer interacts with the remote merchant Web site using the commands and structure hierarchy as originally established by the merchant. As the consumer navigates through the remote merchant's Web site, the consumer may return to the database interface to launch into a different remote merchant Web site. The problem with this approach is that the consumer still has to learn how to navigate and place orders through many different merchants. For example, if a consumer desires to purchase a product from Merchant A and Merchant B, the consumer will have to navigate each merchant's site. Today, either the Web shopping sites direct the consumer to another merchant Web site, or they place the merchant's Web site within a frame on one of their main pages. A problem with this approach is that the consumer does not have a consistent look and feel. What is needed is a shopping site that provides a uniform ordering and navigation from multiple merchants.

As e-commerce has developed, the term "shopping basket" or "shopping cart" has become commonly known on the Internet to refer to a virtual shopping cart where the consumer stores the products and/or services he/she is interested in purchasing while browsing a particular merchant's Web site. A shopping cart typically allows a consumer to add or delete products, specify attributes, such as color, quantity, size, and the like, and purchase products contained within the cart. Once the consumer has completed his/her selections of the products he or she is interested in purchasing, the consumer typically clicks on a link on one of the merchant's Web pages to purchase the contents of the shopping basket. A problem with the shopping carts, however, is that they are specific to each merchant. Another problem is that the shopping carts do not allow a consumer to keep products from different merchants not purchased in their shopping cart from one visit to the next shopping site. It would be desirable, therefore, to have a shopping cart that would maintain the items in the cart persistently until the consumer decides to delete the product or purchase the product.

Another problem is that the shopping site may "lose" the consumer after the consumer becomes interested in a product. For example, assume the shopping site returned two products from two different merchants based on the consumer's criteria. If the consumer clicks on the link for the first product the shopping site may either direct the consumer to Merchant A or may provide the merchant's site within a frame of the shopping site. Nevertheless, the consumer at this point is able to go directly to the merchant's site and bypass the shopping site when purchasing the products. It would be desirable, therefore, to provide a method and system by which consumers would not be directed to other merchants even though products they purchase may come from other merchants.

Accordingly, a method and system are needed that provide a consumer with a uniform ordering and navigation tool through multiple merchants. The method and system should enable the consumer to order products from multiple merchants using a single shopping cart. In addition, the method and system should provide the consumer with a consistent look and feel regardless of the merchant from whom the consumer is ordering products. Further, the method and system should provide a consistent matter of inputting and returning matches to a consumer searching a merchant's Web site. The present invention solves these problems as well as others presented by the prior art.

SUMMARY OF THE INVENTION

The present invention is directed to providing a method, apparatus and system for a universal shopping cart ("USC") and order injection system In particular, the present invention is directed to providing a shopping cart that obtains products for a consumer across many different merchant sites while maintaining a consistent user interface for the consumer no matter from which merchant the products are retrieved or obtained. More specifically, the USC allows a consumer to search for, monitor and order products from many different merchants located on the Internet. The consumer completes all of their shopping on the shopping site provided by the present invention and is not directed to another merchant's site to complete an order. In one embodiment of the invention, the USC provides a monitoring service allowing the consumer to monitor a product for specified criteria. For example, the consumer may monitor a particular product for price.

The order injection system places orders for products contained within the USC from affiliated and non-affiliated merchants. Specific ordering details required from merchants external to the shopping site are hidden from the consumer. For example, if the external merchant site requires a consumer account before allowing the product to be purchased, the shopping site creates a new consumer account without intervention from the consumer. Once the products are ordered, the consumer may keep track of the ordered products from the shopping site.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 18-20 are exemplary Web pages illustrating logging on to an e-commerce site;

DETAILED DESCRIPTION

Figure 1:
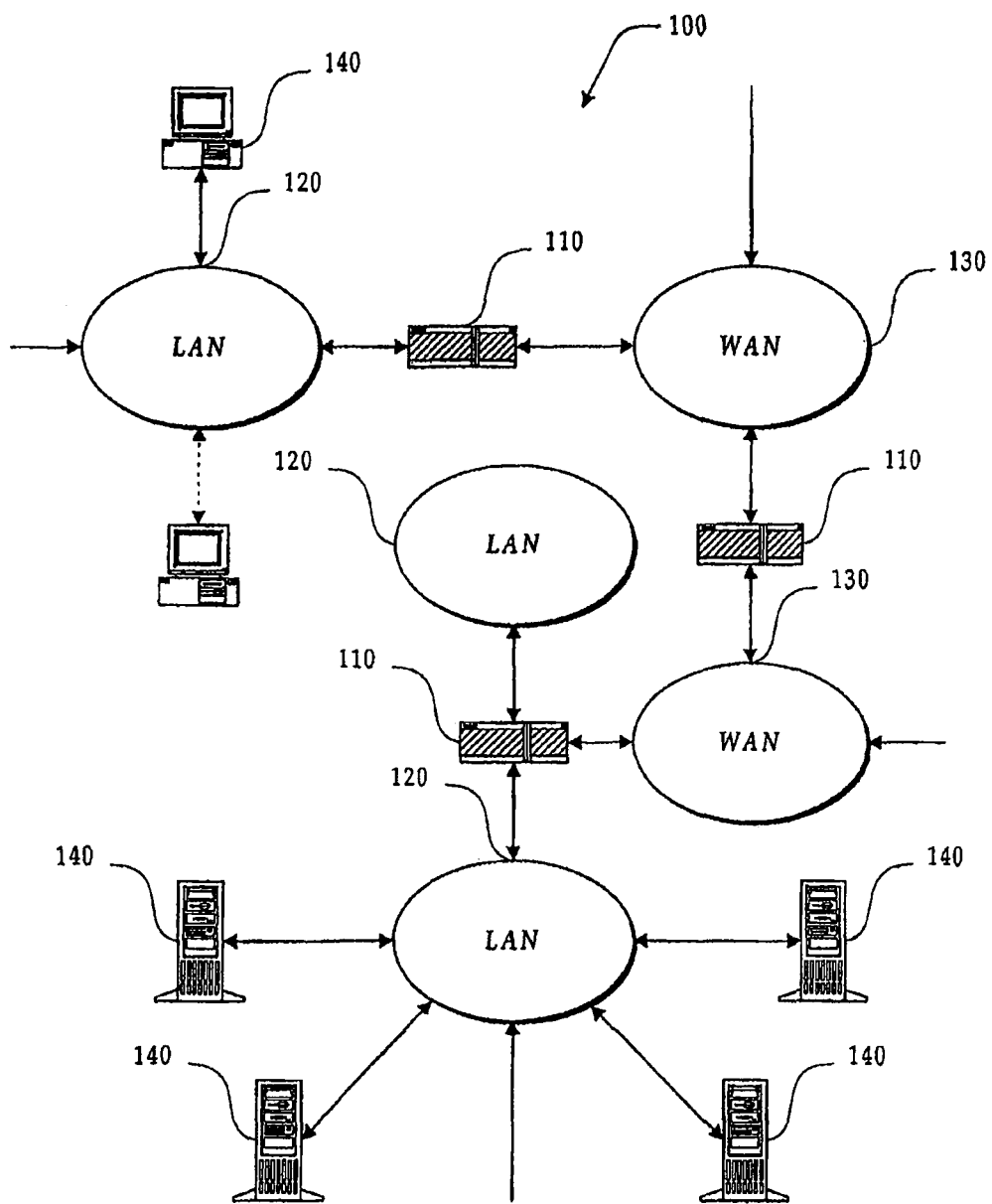
FIG. 1 (Prior Art) is an illustration of a representative portion of an internetwork such as the Internet.

As will be better understood from the following description, the present invention is embodied at least in part in a Web site accessible via the Internet. As is well known by those skilled in the art, the term "Internet" refers to the collection of networks and routers that use the transmission control protocol/Internet protocol ("TCP/IP") or next generation protocols to communicate with one another. A representative section of the Internet 100 is shown in FIG. 1. A plurality of local area networks ("LANs") 120 in a wide area network ("WAN") 130 are interconnected by routers 110. The routers 110 are special purpose computers used to interface one LAN or WAN to another. Communication links within the LANs may be twisted wire, coaxial cable, fiber-optic, wireless links or other communication links known to those skilled in the art. While communication links between networks may utilize analog telephone lines, digital lines, fiber-optic, wireless or other communication links known to those skilled in the art. Furthermore, computers, such as remote computers 140, and other related electronic devices such as telephones, personal digital assistants ("PDAs"), etc., can be remotely connected to either the LANs 120 or WANs 130 via a modem (not shown) and a temporary communication link, such as a telephone line or wireless connection (shown as a dotted line). As will be appreciated by those of ordinary skill in the art, the Internet 100 comprises a vast number of such interconnected networks, computers, and routers and that only a small, representative portion is shown in FIG. 1.

The Internet 100 has recently seen explosive growth by virtue of its ability to link computers located throughout the world. As the Internet 100 has grown, so has the Web. As will be readily appreciated by those skilled in the art, the Web is a vast collection of interconnected or "hypertext" documents formatted in the HyperText Markup Language ("HTML") or other markup languages that are electronically stored at Web sites throughout the Internet 100. A Web site resides on a server computer such as the e-commerce server 400 illustrated in FIG. 4 connected to the Internet 100 that has storage facilities for storing hypertext documents and that runs Web server software 460 for handling requests for those stored hypertext documents. A hypertext document normally includes a number of hyperlinks, usually displayed on a monitor as highlighted portions of text, which link the document to another hypertext document stored at the same Web site or some other Web site located elsewhere on the Internet 100. Each hyperlink is associated with a Uniform Resource Locator ("URL") that provides the location of the linked document on the Web server connected to the Internet. Thus, whenever a hypertext document is retrieved from any Web server, the document is considered to be retrieved from the Web. As is known to those skilled in the art, a Web server may also include facilities for storing and transmitting application programs, such as application programs written in the JAVA® programming language from Sun Microsystems for execution on a remote computer. Likewise, a Web server may also include facilities for executing scripts and other programs on the Web server itself.

A consumer or other remote user may retrieve hypertext documents from the Web via a Web browser application program. A Web browser, such as the NETSCAPE NAVIGATOR® browser or the MICROSOFT® Internet Explorer browser, is a software application program for providing a user interface with the Web. Upon request from the consumer via the Web browser, the Web browser accesses and retrieves the desired hypertext document from the appropriate Web server using the URL for the document and a protocol known as hypertext transfer protocol ("HTTP"). HTTP is a higher level protocol than TCP/IP and is designed specifically for the requirements of the Web. It is used on top of TCP/IP to transfer hypertext documents between servers and clients. The Web browser may also retrieve application programs from the Web server, such as JAVA applets, for execution on the consumer device 300. It will be appreciated by those skilled in the art that protocols other than HTTP may be used. For example, a URL might designate the file transfer protocol ("FTP") or Secure HyperText Transfer Protocol ("HTTPS").

The present invention is directed to providing a USC allowing the ordering and purchasing of products from many different merchants on the Internet. One embodiment of the invention provides a USC having a common user interface. The common user interface allows the consumer to purchase products from different merchants using the same user interface. For example, if a consumer is searching for books, videos and appliances, the consumer will likely be presented with books, videos and appliances from several different merchants. The consumer, however, will be able to order Book A from Merchant A, and Book B from Merchant B using the same ordering form.

Figure 2:
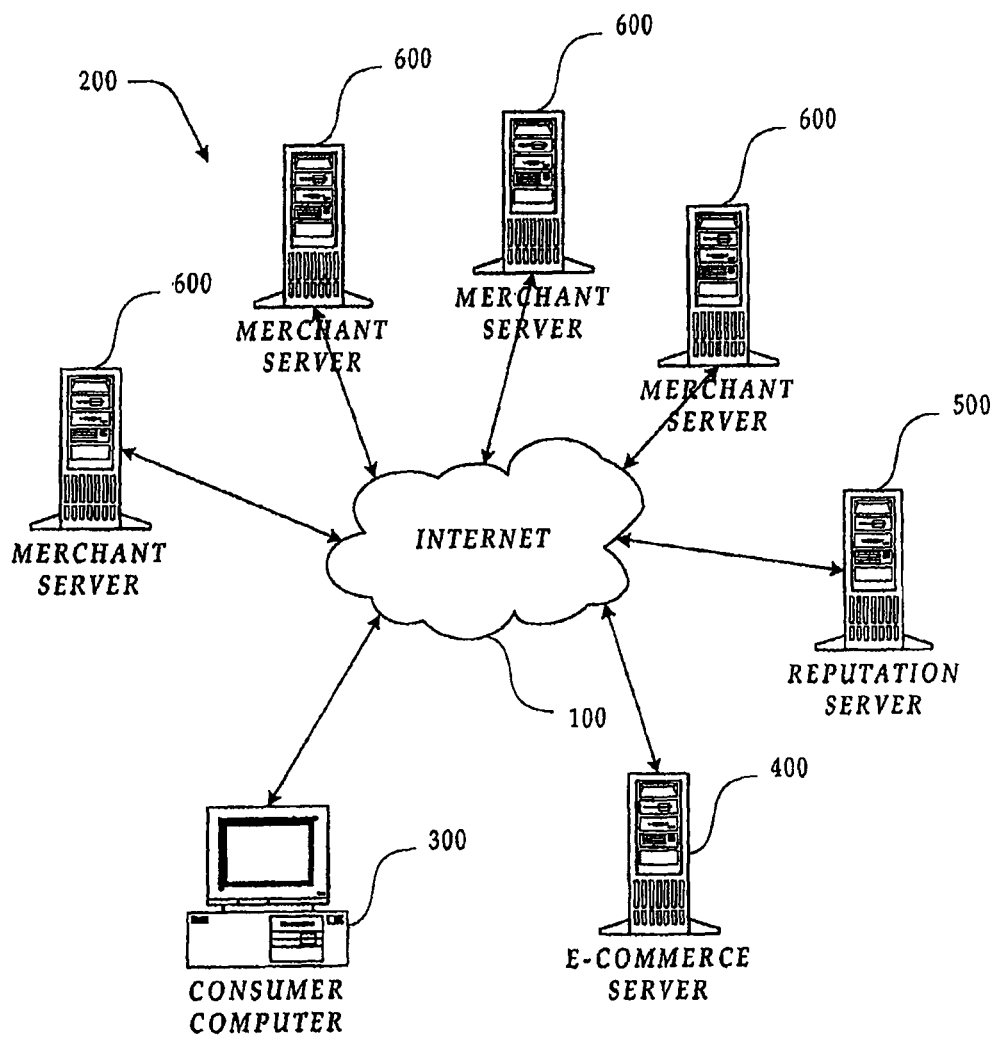
FIG. 2 is a pictorial diagram of a number of servers connected to an internetwork which allow a consumer device also connected to the internetwork to purchase products and/or services using a USC in accordance with the present invention.

A system 200 of computers and devices to which the e-commerce server 400 is connected and to which the consumer device 300 is also connected is shown in more detail in FIG. 2. In addition to the consumer device 300 and the e-commerce server 400, the system 200 includes a reputation server 500 and at least one merchant server 600. Although in one embodiment the consumer device 300 is a personal computer, those of ordinary skill in the art will appreciate that the consumer device 300 could be a wireless device such as a pager, a cellular telephone, Web-enabled landline telephone, PDA or any other type of consumer device 300 capable of communicating with the e-commerce server 400. Moreover, those of ordinary skill in the art will recognize that while only one consumer device 300, one e-commerce server 400 and one reputation server 500 are depicted in FIG. 2, numerous consumer devices 300, e-commerce servers 400 and reputation servers 500 may be interconnected to operate in accordance with the present invention.

In one embodiment of the invention, the e-commerce server 400 generates Web pages containing product information that can be viewed by the consumer using standard Web browsers. In another embodiment, the e-commerce server 400 creates a network presence, in which the e-commerce server 400 sends a customized data stream containing product and merchant information over the network to the consumer devices 300. The consumer device 300 runs a proprietary program that produces a user interface configured to accept the customized data stream and to allow the consumer to view product information, select products, and order products all using the same interface.

Figure 3:
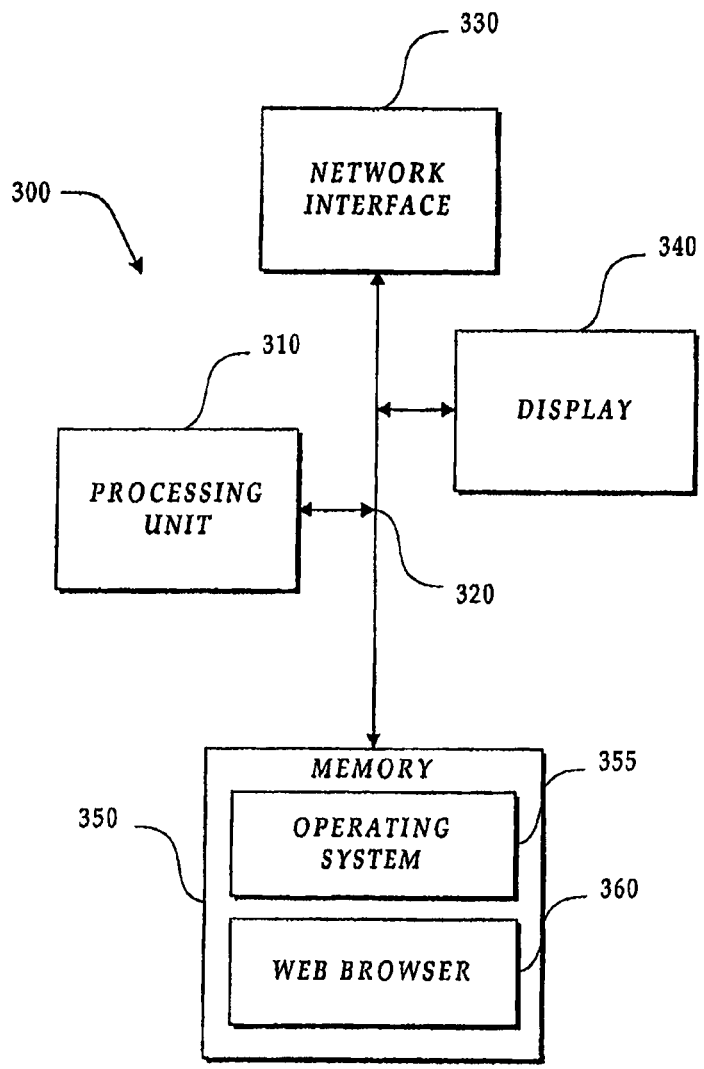
FIG. 3 is a block diagram illustrating several of the components of a consumer device.

FIG. 3 depicts several of the key components of a consumer device 300 used by a consumer to order products via the Internet in accordance with the present invention. Those of ordinary skill in the art will appreciate that the consumer device 300 includes many more components than those shown in FIG. 3. However, it is not necessary that all of these generally conventional components be shown in order to disclose an illustrative embodiment for practicing the present invention. As shown in FIG. 3, the consumer device 300 includes a network interface unit 330 for connecting to a LAN 120 or WAN 130. As will be appreciated by those of ordinary skill in the art, the network interface unit 330 includes the necessary circuitry for such a connection, and is also constructed for use with the TCP/IP protocol, the particular network configuration of the LAN 120 or WAN 130 it is connecting to, and a particular type of coupling medium. Alternatively, the consumer device 300 may also be equipped with a modem for connecting to the Internet through a point to point protocol ("PPP") connection or a serial line Internet protocol ("SLIP") connection as known to those skilled in the art.

The consumer device 300 also includes a central processing unit 310, a display 340 and a memory 350 connected via a bus 320. The memory 350 generally comprises random access memory ("RAM"), and read-only memory ("ROM") and a persistent mass storage device such as a hard disk drive. The memory 350 stores an operating system 355 for controlling the operation of the consumer device 300. The memory 350 also includes a Web browser 360, such as the NETSCAPE NAVIGATOR® browser or the MICROSOFT® Internet Explorer browser, for accessing the Web. Web browser 360 may also store a JAVA virtual machine used to execute JAVA "applets" as known to those skilled in the art. It will be appreciated that these components may be stored on a computer-readable medium and loaded into memory 350 of the consumer device 300 using a drive mechanism associated with the computer-readable medium, such as a floppy or a CD-ROM/DVD-ROM drive.

Figure 4:
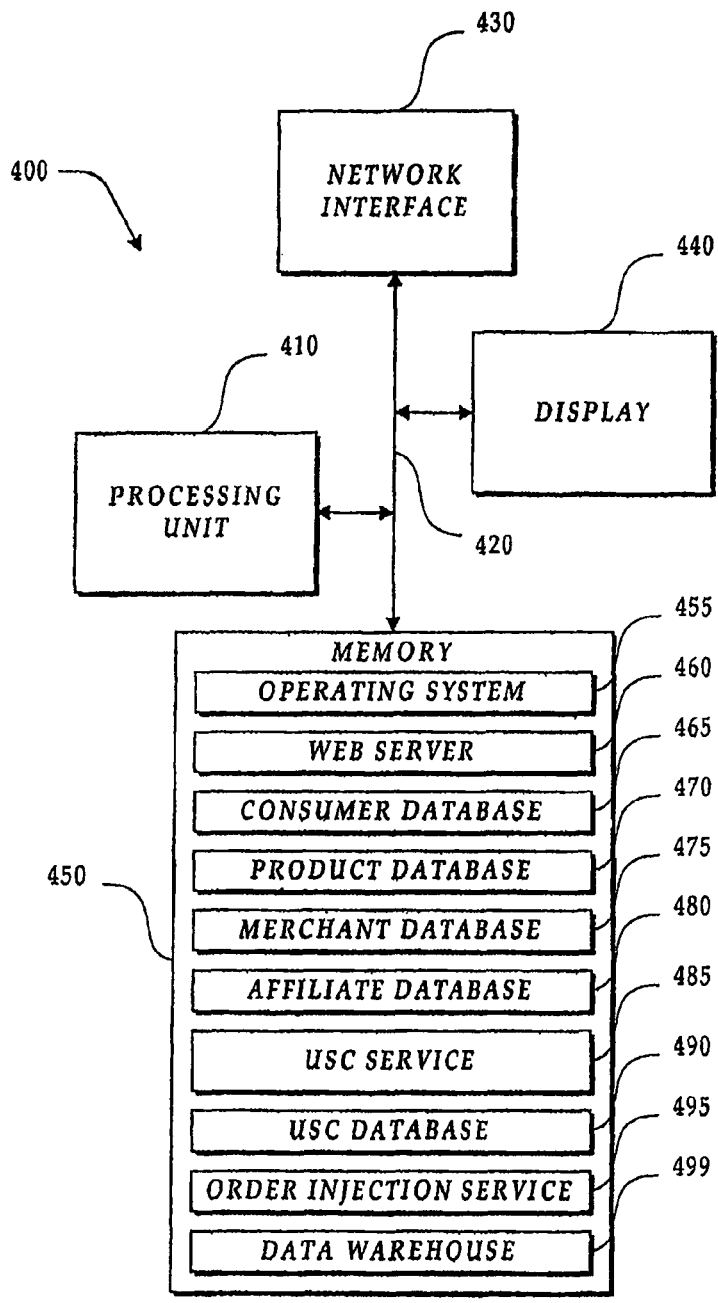
FIG. 4 is a block diagram illustrating several of the components of an e-commerce server.

FIG. 4 depicts several of the components of an e-commerce server 400 used to implement the present invention. Those of ordinary skill in the art will appreciate that the e-commerce server 400 includes many more components than those shown in FIG. 4. However, it is not necessary that all of these generally conventional components be shown in order to disclose an illustrative embodiment for practicing the present invention. As shown in FIG. 4, the e-commerce server 400 is connected to the Internet 100, or other communications network, via a network interface unit 430. Those of ordinary skill in the art will appreciate that the network interface unit 430 includes the necessary circuitry for connecting the e-commerce server 400 to the Internet 100, and is constructed for use with the TCP/IP protocol.

The e-commerce server 400 also includes a central processing unit ("CPU") 410, a display 440, and mass memory 450, connected via a bus 420. The memory 450 generally comprises RAM, ROM, and some form of persistent mass storage device, such as a hard disk drive, tape drive, optical drive (such as CD-ROM or DVD-ROM), floppy disk drive, or combination thereof. The memory 450 stores an operating system 455 for controlling the operation of the e-commerce server 400. It will be appreciated that the operating system may be formed by any one of several server operating systems well known to those of ordinary skill in the art, such as UNIX®, MAC OS® or MICROSOFT® WINDOWS NT® In addition, memory 450 stores Web server software 460, as well as databases 465, 470, 475, 480 and 490 containing information on consumer, merchant, product, affiliate, and USC information respectively.

The memory 450 also stores the program code and data necessary for enabling a consumer to order products from multiple e-commerce sites via a USC in accordance with the present invention. More specifically, the memory 450 stores a USC service 485 which enables the consumer to order products from many different merchants, and an order injection program 475 which places orders for products contained within the USC with the appropriate merchants. In one embodiment of the invention, the reputation server 500 is stored on the e-commerce server 400.

Figure 5:
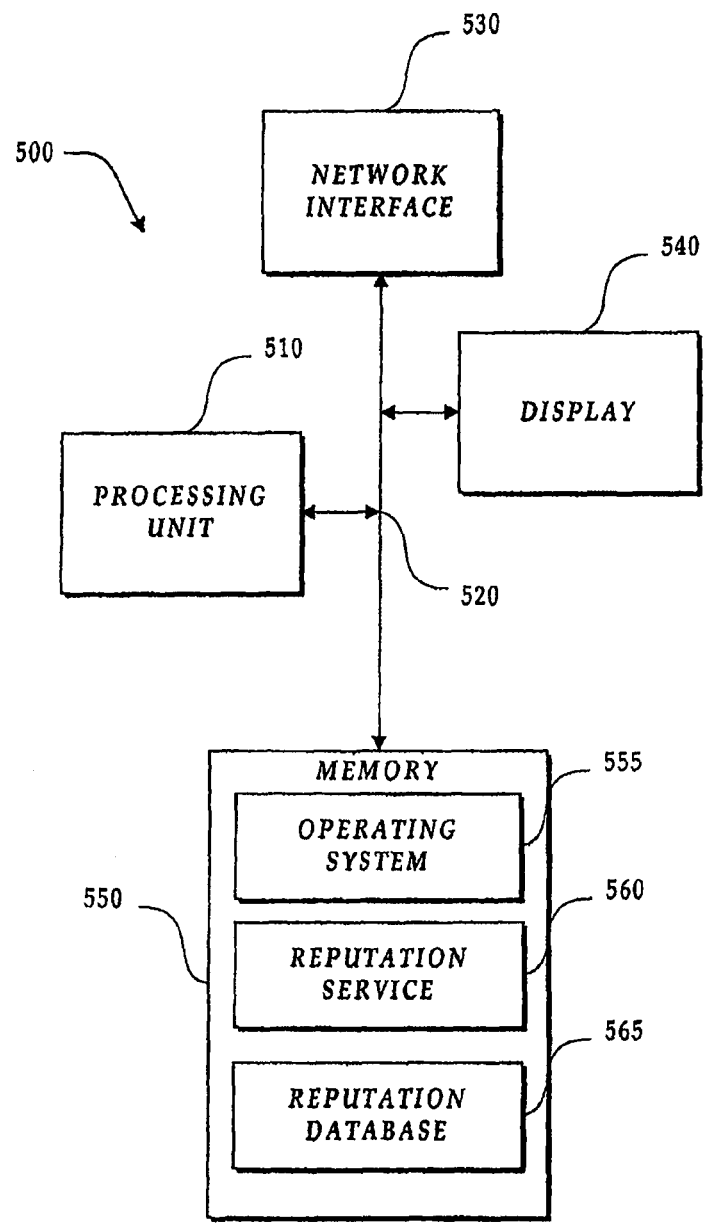
FIG. 5 is a block diagram illustrating several of the components of a reputation server.

FIG. 5 depicts several of the key components of a reputation server 500 used to implement the present invention. Those of ordinary skill in the art will appreciate that the reputation server 500 includes many more components then those shown in FIG. 5. However, it is not necessary that all of these generally conventional components be shown in order to disclose an illustrative embodiment for practicing the present invention. As shown in FIG. 5, the reputation server 500 includes a network interface unit 530 for connecting to a LAN 120 or WAN 130. As will be appreciated by those of ordinary skill in the art, the network interface unit 530 includes the necessary circuitry for such a connection, and is also constructed for use with the TCP/IP protocol, the particular network configuration of the LAN 120 or WAN 130 it is connecting to, and a particular type of coupling medium. Alternatively, the reputation server 500 may also be equipped with a modem for connecting to the Internet through a PPP connection or a SLIP connection as known to those skilled in the art.

The reputation server 500 also includes a central processing unit 510, a display 540 and a memory 550 connected via a bus 320. The memory 550 generally comprises RAM, and ROM and a persistent mass storage device such as a hard disk drive. The memory 550 stores an operating system 555 for controlling the operation of the reputation server 500. The memory 550 also includes a reputation service program 560 and a reputation database 565. It will be appreciated that these components may be stored on a computer-readable medium and loaded into memory 550 of the reputation server 500 using a drive mechanism associated with the computer-readable medium, such as a floppy or a CD-ROM/DVD-ROM drive.

Figure 6:
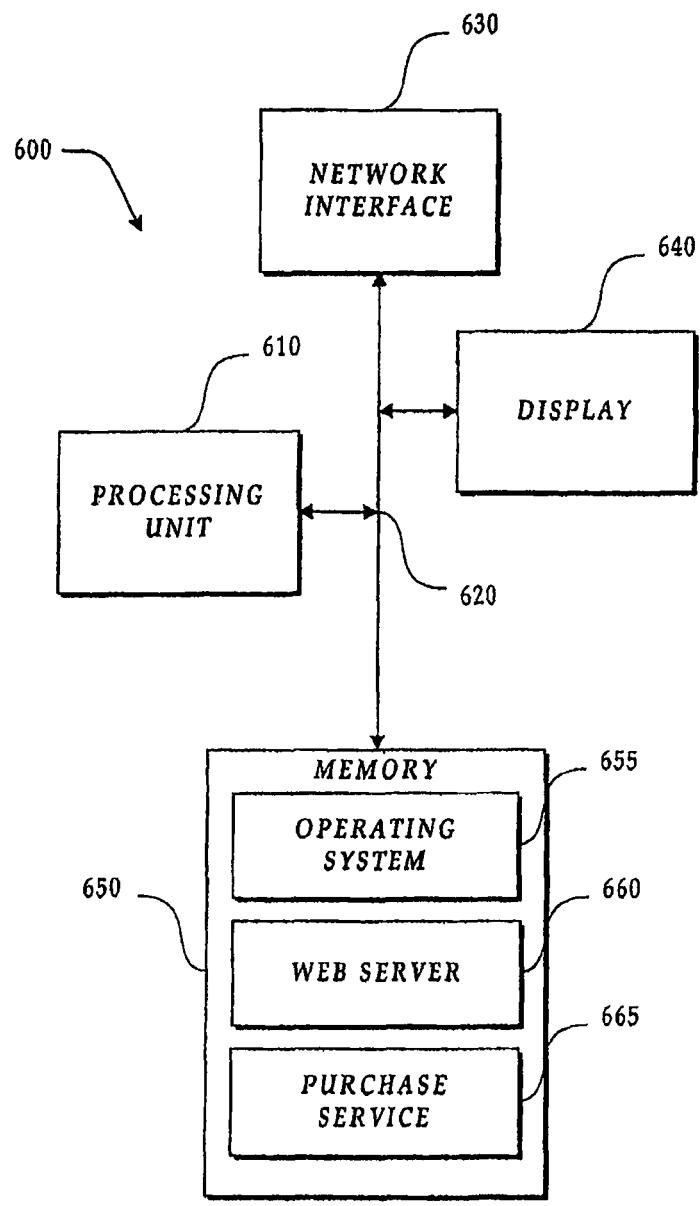
FIG. 6 is a block diagram illustrating several of the components of a merchant server.

FIG. 6 depicts several of the key components of a merchant server 600 used to implement the present invention. Those of ordinary skill in the art will appreciate that the merchant server 600 includes many more components than those shown in FIG. 6. However, it is not necessary that all of these generally conventional components be shown in order to disclose an illustrative embodiment for practicing the present invention. As shown in FIG. 6, the merchant server 600 includes a network interface unit 630 for connecting to a LAN 120 or WAN 130. As will be appreciated by those of ordinary skill in the art, the network interface unit 630 includes the necessary circuitry for such a connection, and is also constructed for use with the TCP/IP protocol, the particular network configuration of the LAN 120 or WAN 130 it is connecting to, and a particular type of coupling medium. Alternatively, the merchant server 600 may also be equipped with a modem for connecting to the Internet through a PPP connection or a SLIP connection as known to those skilled in the art.

The merchant server 600 also includes a central processing unit 610, a display 640 and a memory 650 connected via a bus 620. The memory 650 generally comprises RAM, and ROM and a persistent mass storage device such as a hard disk drive. The memory 650 stores an operating system 655 for controlling the operation of the merchant server 600. The memory 650 also includes a Web server program 660 and a purchase service program 665. It will be appreciated that these components may be stored on a computer-readable medium and loaded into memory 650 of the merchant server 600 using a drive mechanism associated with the computer-readable medium, such as a floppy or a CD-ROM/DVD-ROM drive.

Figure 7:
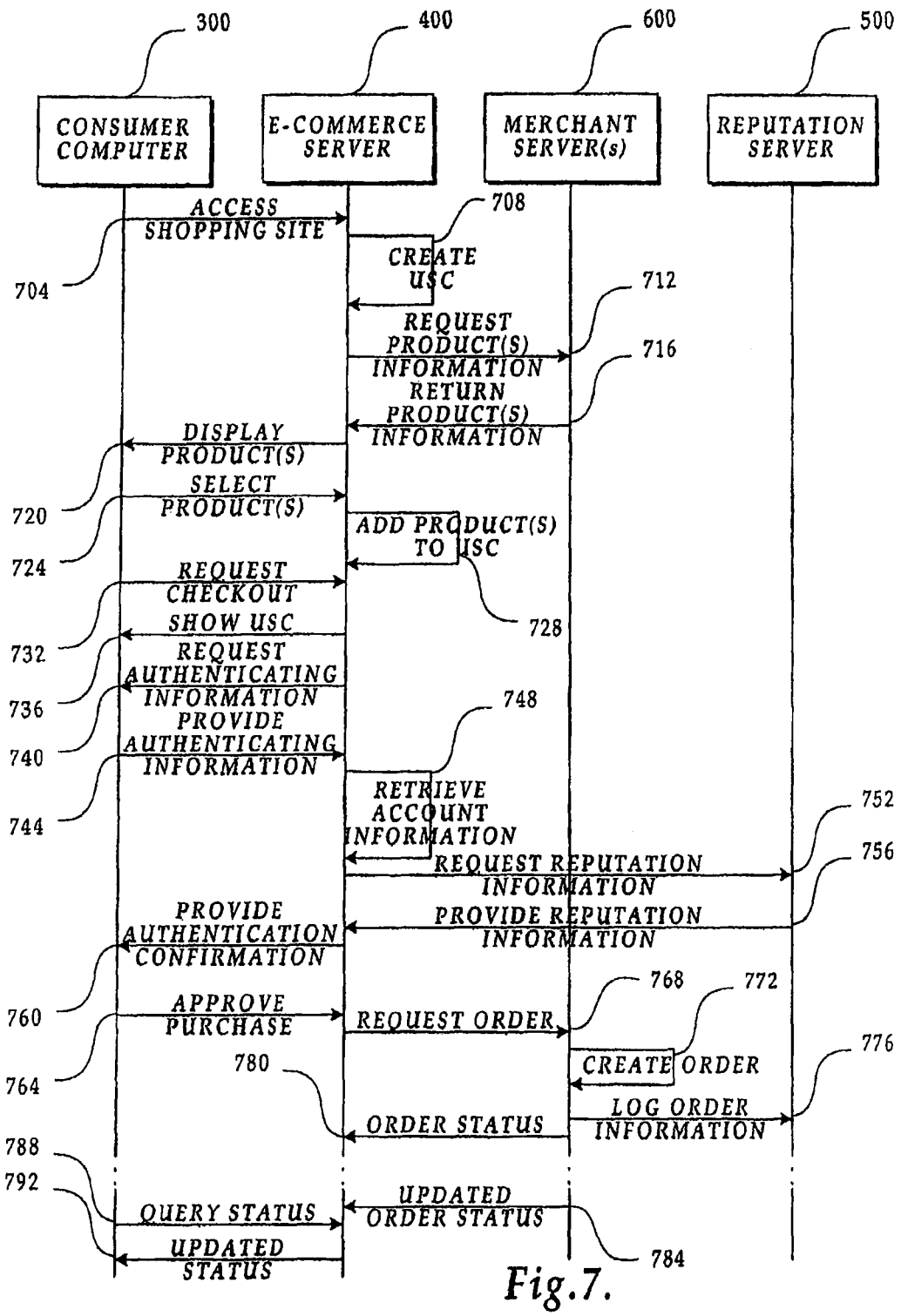
FIG. 7 is a diagram illustrating the actions taken by a consumer device, an e-commerce server, a reputation server and one or more merchant servers to allow a consumer to purchase products and/or services using a USC in accordance with the present inventions.

FIG. 7 illustrates the actions taken by the consumer device 300, the e-commerce server 400, the merchant server(s) 600, and the reputation server 500 to make a purchase request using a USC in accordance with the present invention. The interactions of the various actions are illustrated and described in greater detail later with reference to the diagrams shown in FIGS. 8, 13, 16 and 21-28. Returning to FIG. 7, the purchase process is initiated when a consumer accesses 704 a shopping site via the Internet 100 using the Web browser 360 installed on the consumer device 300. The e-commerce server 400 then creates 708 a USC for the consumer. The e-commerce server 400 then requests 712 and receives 716 product information from merchant server(s) 600 for display 720 to the consumer on the consumer device 300. The consumer then selects 724 product(s) to add to the USC. The e-commerce server 400 adds 728 the products that the consumer selected to the USC. The consumer may then request to check out 732. The e-commerce server 400 would then show the consumer device 300 the contents of the USC 736 and would then request that the consumer authenticate themselves 740 before checking out. The consumer would then provide authenticating information 744. After receiving the authenticating information, the e-commerce server 400 would then retrieve 748 the consumer's account information. The e-commerce server 400 may also request 752 reputation information (such as their credit worthiness, record of past payments, numbers of product returns and other reputation influencing information) on the consumer from a reputation server 500. The reputation server 500 returns the consumer's reputation information 756 to the e-commerce server 400. The e-commerce server then confirms to the consumer device 300 that the authentication was successful 760. The consumer is then given a final chance to approve the purchase 764. Once approved the e-commerce serve 400 proceeds to request order(s) 768 from merchant server(s) 600 who then in turn create order(s) 772. Each merchant may then log reputation information 776 with the reputation server 500. After the order status changes (e.g., from "on order" to "shipped") the merchant server(s) 600 send an updated order status 784 to the e-commerce server 400. The consumer device 300 may then at some point query 788 and receive 792 from the e-commerce server 400 a status update on the order.

It will be appreciated by those of ordinary skill in the art that the order of the operations in FIG. 7 may be altered without substantially affecting the operation of the present invention. For example, the consumer may begin the authentication process before selecting any products.

Figure 8:
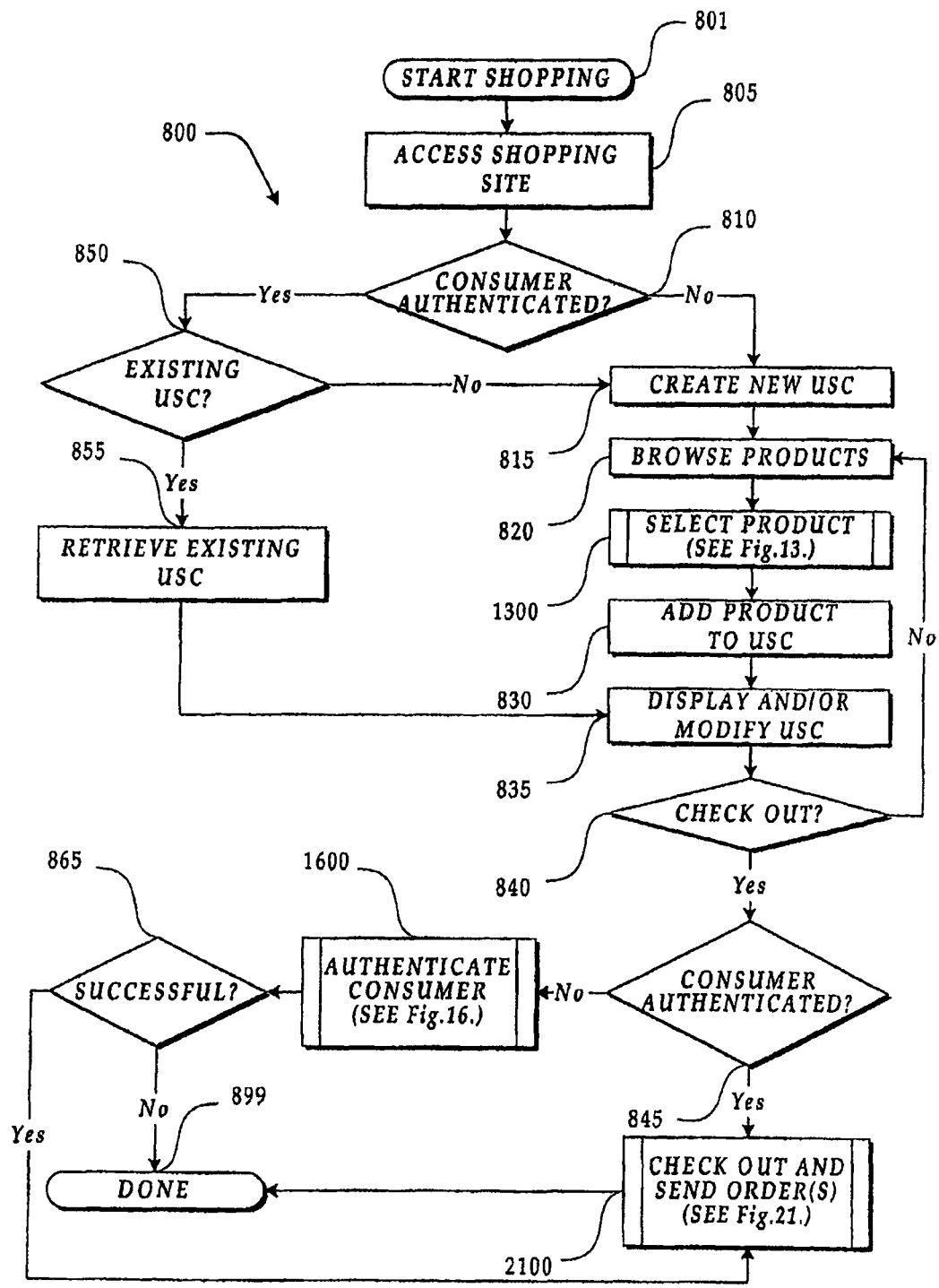
FIG. 8 is an overview flow diagram illustrating a process for shopping and ordering products.
Figure 9:
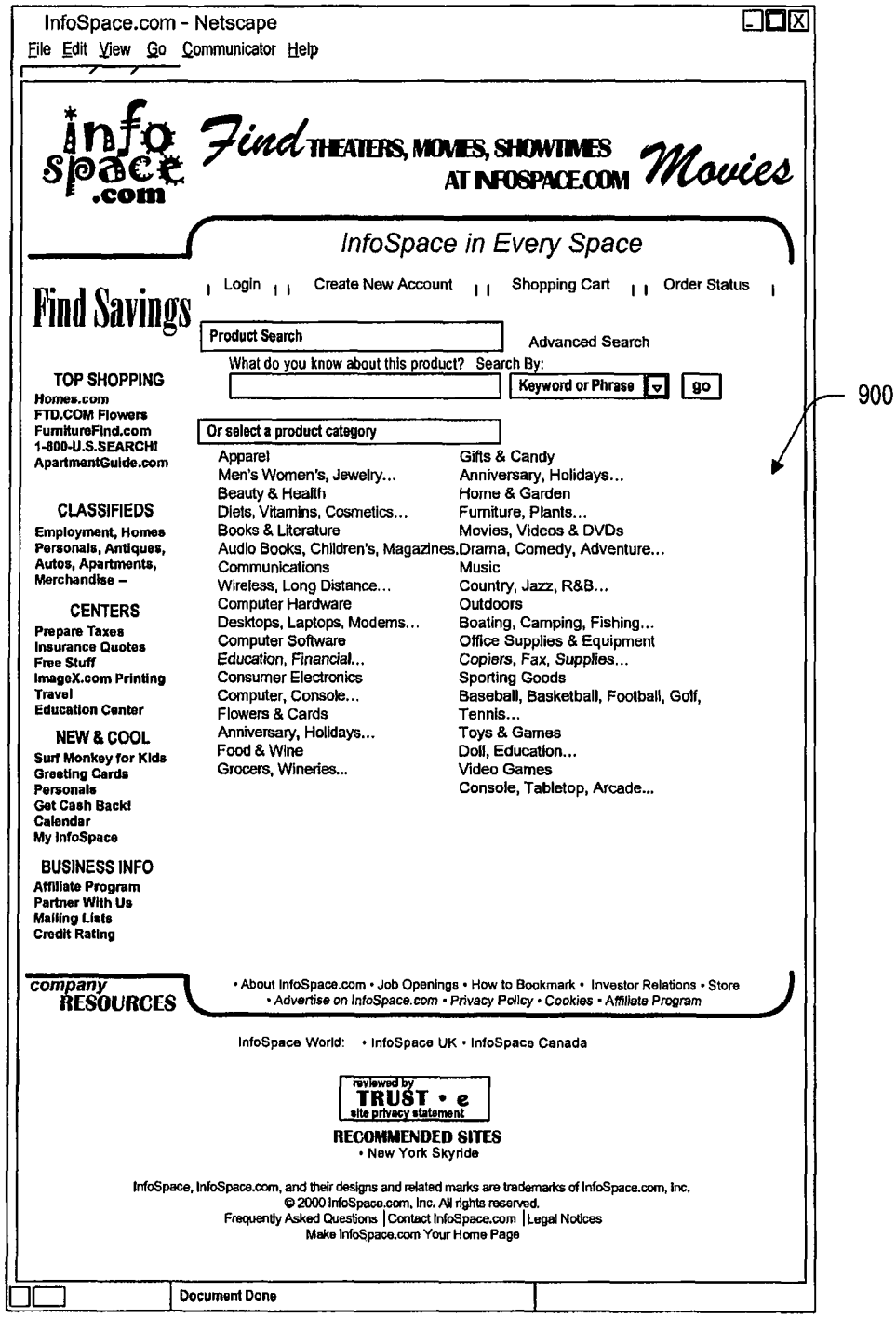
FIGS. 9-12 are exemplary Web pages illustrating shopping display on an e-commerce site.

The present invention is directed to providing a shopping cart that obtains products for a consumer across many different merchant sites while maintaining a consistent user interface for the consumer no matter from which merchant the products are retrieved or obtained. Instead of redirecting the consumer to an external site when the consumer selects a product located on an external merchant site, the e-commerce server 400 maintains control of the consumer throughout the entire shopping process. Accordingly, FIG. 8 illustrates an exemplary overview logic routine 800 illustrating the present invention. Routine 800 starts at block 801 and proceeds to block 805 where a consumer accesses the shopping site (see FIG. 9 and description below). At decision block 810 a determination is made as to whether the consumer has been authenticated. For an authenticated consumer, processing continues to decision block 850 where it is determined whether the consumer has an existing cart. If the consumer has an existing cart, then the cart is retrieved at block 855 from the USC database 490 and modified at block 835 if required. If no cart exists, routine 800 creates an empty USC in block 815.

Figure 10:
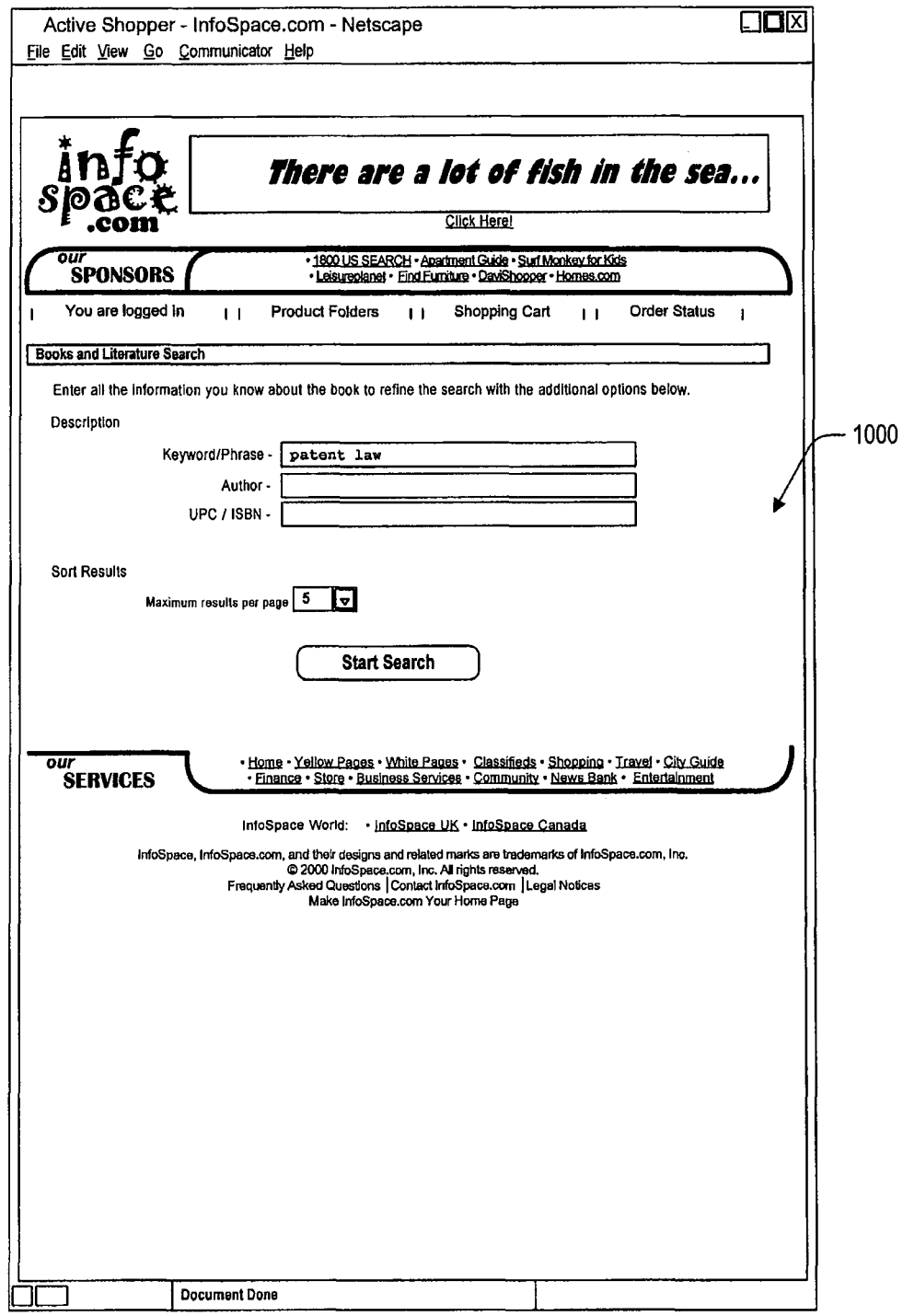
Figure 13:
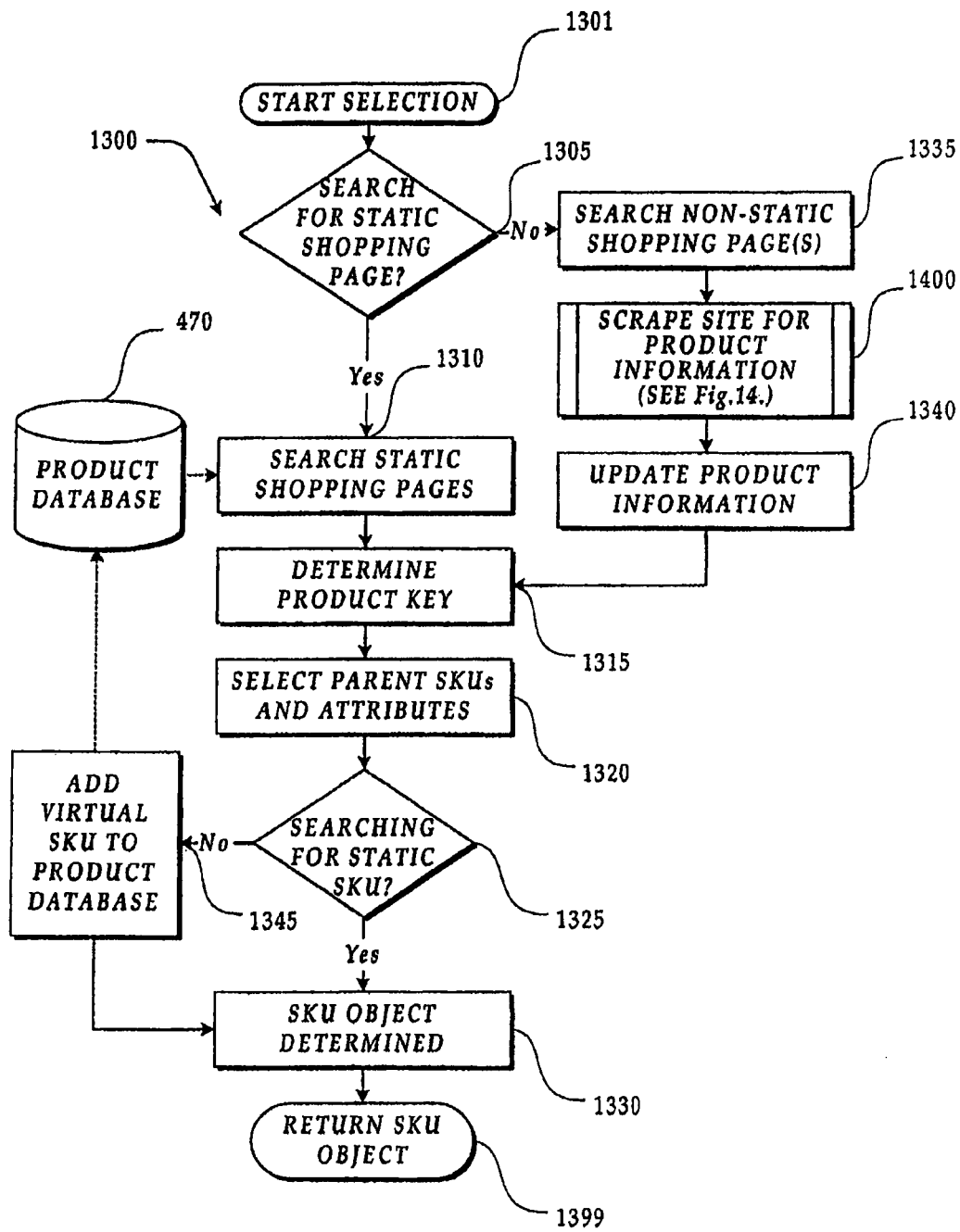
FIG. 13 is a flow chart illustrating selecting a product to add to a USC.

Once the USC has been created in block 815, the consumer may then browse or search through products in block 820 (see FIG. 10 and description below) and select those products they wish to purchase (block 1300, see FIG. 13 and description below). As will be appreciated by those of ordinary skill in the art, identifying and searching for products can be done in many different ways. For example, in one embodiment of the invention, the consumer enters information about the products into a search engine. Based on the information input into the search engine, a list of products is returned to the consumer on a Web page. In another embodiment of the invention, the search engine searches a product database 470 stored on the e-commerce server 400 containing a list of currently available products from many different merchants. In another embodiment, the search engine searches external databases that are not contained on the e-commerce server 400 but are located on remote computers. As will be appreciated by those of ordinary skill in the art, many different search engines can be used. In yet another embodiment, a classification system is established that divides goods or services into categories of specific types. For example, categories can include, among many others, clothes, books, music, video, jewelry and the like.

Figure 11:
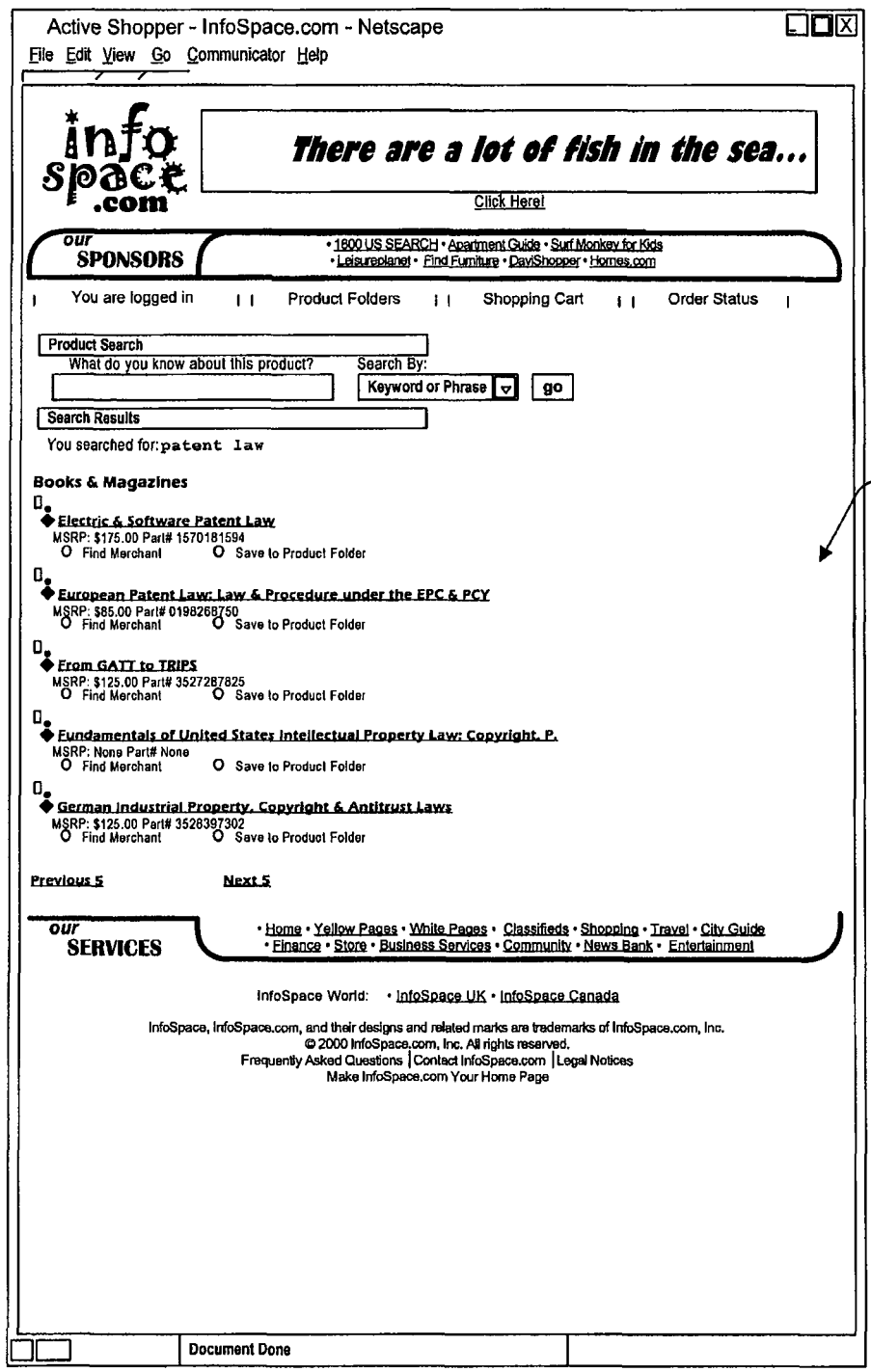
Figure 12:
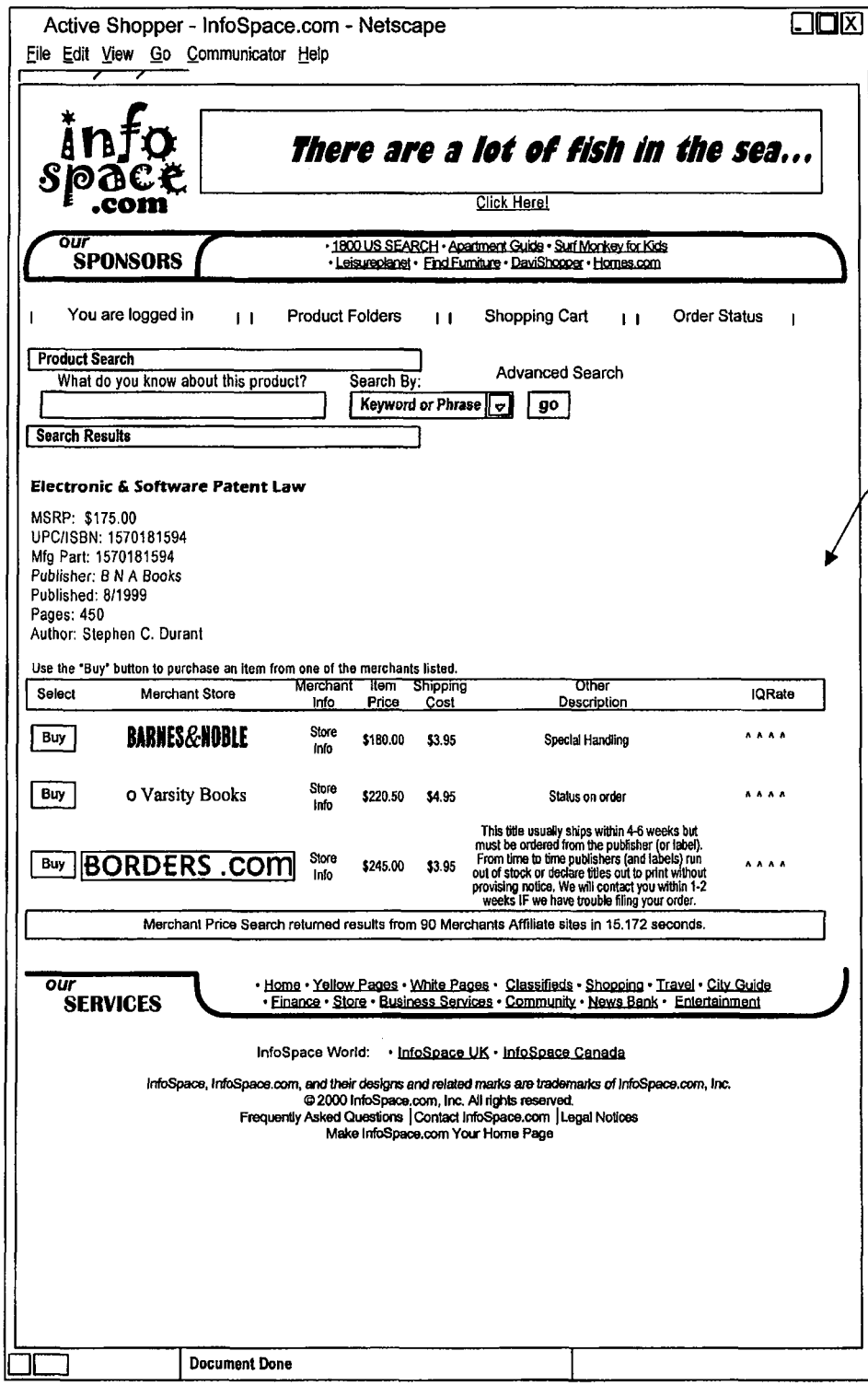

The shopping search results containing products matching the search criteria are then returned and reviewed by the consumer. In one embodiment, the consumer browses these results on a Web page (see FIG. 11 and description below) provided by the e-commerce server 400. In another embodiment, the search results are sent electronically to a wireless device, such as a telephone, or PDA. As will be appreciated by those of ordinary skill in the art, wireless devices are more restricted by the amount of information they may display as compared to a personal computer. Therefore, the information sent to the wireless device is formatted for viewing on a wireless device. Well known presentation formats for wireless devices are Handheld Device Markup Language ("HDML") documents and Wireless Markup Language ("WML") documents. As will be appreciated by those skilled in the arts, HDML and WML documents may be viewed on conventional microbrowsers such as phone.com's™ UP.link microbrowsers. If the consumer is interested in a particular product, the product may be added to the consumer's USC in block 830. In one embodiment of the invention, the consumer selects (block 1300) the product by clicking on a hyperlink to add the product to the cart. As will be appreciated by those of ordinary skill in the art, there are many methods of selecting a product. For example, a consumer may drag an icon or hyperlink representing the product to an icon or hyperlink representing the USC.

For clarity of illustration, the phrase "product type" will be used to described a type of merchandise that is sold be several merchants. For example, an "NEC 17 inch LCD monitor" is a "product type". The phrase "product" will be used to describe an item that is carried by a particular merchant. For example, an "NEC 17 inch LCD monitor from Circuit City" is a "product". When a consumer selects a product, both the product type and the merchant are determined.

In the present invention, once a selected product is added to the USC in block 830, the consumer may modify the cart in block 835 by changing products (line items) in the cart; setting triggers; or modifying a wish list. For example, the consumer may modify the attributes associated with each product (line item) contained within the cart. In one embodiment of the present invention, modifying attributes includes editing the quantity of the product, deleting the product from the cart or changing product attributes. Changing attribute may include such things as color, size, material and the like. In one embodiment of the invention, this information is modified using standard HTML. Modifying the cart may also include clearing products from the cart and/or setting a cart expiration. More specifically, the consumer would click on a button on a Web page to remove the products from the cart. Since a cart may be retrieved at a later date, a consumer may decide to have the cart expire on its own at a specified time.

For example, the consumer enters a time and date into a Web page form (not shown) provided by the e-commerce server 400. A time process keeps track of the consumer specified expiration date and removes the products at the specified time. It will be appreciated by those skilled in the art that yet other triggers may be set by the consumer manually and by the USC automatically. In one embodiment of the invention, the consumer may set triggers for price alerts, expiration of product(s) within the cart, and the like. The consumer sets price alert triggers by specifying a price at which the trigger is activated. For example, if the consumer desires to be notified when Product X is at or lower than $10.00 then the consumer enters $10.00 into an input form provided by the e-commerce server 400. In another embodiment, the consumer may specify a price at which the product should be removed from the cart. The consumer may also specify a time when the item should be automatically removed from the cart.

In an alternative embodiment of the present invention, the USC automatically sets triggers for when a quantity of a product is low, or the SKU is ready to expire. For each product in the cart a trigger may be set by the USC for when a product's SKU is going to expire. The SKU expiration date typically depends on the type of product as well as location of the product. In one embodiment of the invention, affiliated merchants provide SKU information directly to the shopping site that is then used to set the expiration date. In another embodiment of the invention, the non-affiliated merchants are scraped to determine this information.

Figure 15:
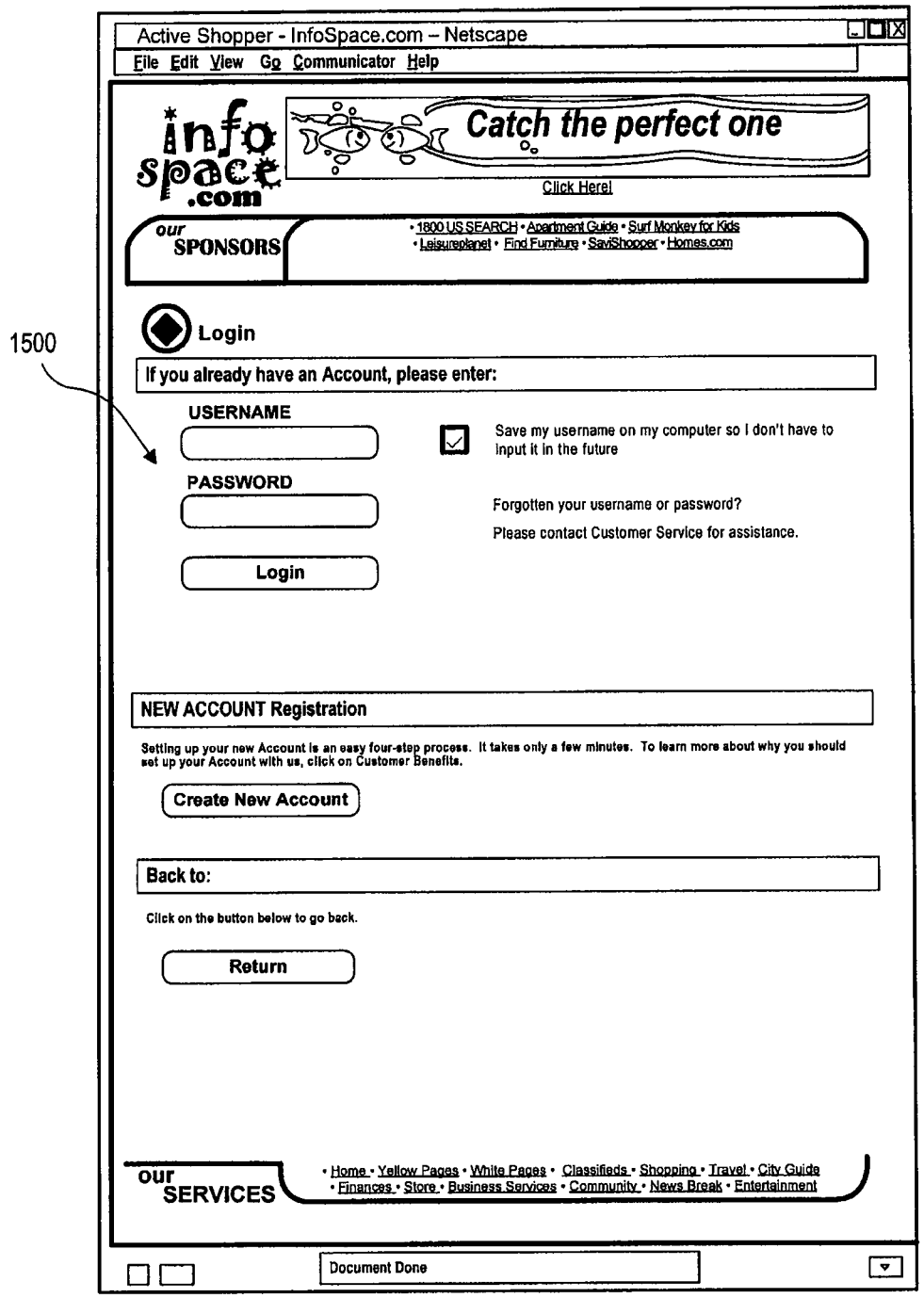
FIG. 15 is an exemplary Web page illustrating logging on to an e-commerce site.

In addition, a cart may be modified if there are products that have outdated or expired SKU numbers. Updating the cart helps to ensure that all of the product information available to the consumer is up to date. For example, if a product has been in a cart persistently for several weeks the product information may have changed since the consumer last accessed their cart. In one embodiment, automatic triggers are implemented to modify the cart. If the consumer has not been authenticated, an empty cart is created for the consumer. In one embodiment of the present invention, the cart is created using HTML. Products are displayed as hyperlinks, which when selected provide the consumer with more information. All of the products, whether retrieved from an affiliated site or a non-affiliated site, are displayed in the same manner to the consumer. In one embodiment of the invention, the consumer may log on to the shopping site and be authenticated, as shown in exemplary log in Web page 1500 shown in FIG. 15, at any time after accessing the shopping site. The consumer may also remain anonymous while shopping until immediately before purchasing products or saving the state of the cart as illustrated in blocks 815 through 840.

The consumer may also modify his/her consumer account information. In one embodiment of the invention the consumer may modify their residential and billing addresses, billing information, shipping address, account password and the like. In one embodiment of the invention, this information is modified through forms provided by the e-commerce server 400.

After any updates or modification have been made to the cart in block 835, routine 800 proceeds to decision block 840, where a determination is made as to whether the consumer desires to check out. If the consumer desires to check out, a determination is made in decision block 845 as to whether the consumer needs to be authenticated. If the consumer has already been authenticated (i.e., the consumer was authenticated earlier in the process) the products in the cart are then ordered (block 2100, see FIG. 21 and description below) and routine 800 ends with block 899. Otherwise, the consumer is authenticated at this time (block 1600, see FIGS. 16 and description below). If at decision block 865 it is found that the consumer was successfully authenticated, then the products are ordered (block 2100) and routine 800 ends at block 899. If the consumer was not found to be authenticated in decision block 845 and the authentication was found to be unsuccessful in decision block 865, then routine 800 ends without a purchase at block 899.

FIGS. 9-12 illustrate exemplary Web pages for browsing, searching and selecting a product in accordance with the present invention. Exemplary Web page 900 presents a number of categories of products that a consumer may choose to order. Web page 1000 illustrates an exemplary Web page forms having fields for searching for specific products. The results of an exemplary search are shown in Web page 1100. After selecting a product from Web page 1100, a consumer might see a Web page such as exemplary selection Web page 1200 where the consumer is presented with the detailed description of the selected product along with a list of prices and handling details from different merchants.

As noted above, FIG. 13 is a diagram 1300 illustrating selecting a product from a shopping site on a merchant server 600 in accordance with the present invention. In one embodiment of the invention, the consumer enters search criteria to locate products as illustrated in exemplary Web page 1000. After selecting a product in Web page 1100 and a merchant in Web Page 1200, subroutine 1300 proceeds to add the selected product to the USC.

Subroutine 1300 starts at block 1301 and proceeds to decision block 1305 where it is determined whether a static shopping page (e.g., hard-coded html Web pages) or a non-static shopping page (e.g., script-based pages, or some other form of dynamically generated HTML pages) is to be searched. If page to be searched is a static page, subroutine 1300 searches for the product amongst static shopping pages in block 1310 retrieved from the product database 470.

In one embodiment of the present invention, the product database 470 maintains product information on products maintained by the shopping site. Product information is also maintained from affiliated merchants. An affiliated merchant is a merchant who has a business relationship with the shopping site. Typically, the affiliated merchant provides the product information directly to the shopping site. Alternatively, the shopping site accesses the product information from the affiliate. Product information may also be maintained on products carried by non-affiliated merchants and stored in the product database 470.

Returning now to decision block 1305, if the shopping page is not static, then subroutine 1300 searches for the product amongst the non-static shopping pages (i.e., dynamically generated Web pages from scripts or common gateway interface programs) in block 1335 on the merchant server 600. An example of a product with a non-static SKU is a magazine, which has a different SKU for each issue. In one embodiment of the invention, this product information is obtained by scraping a non-affiliated merchant server's 600 Web site. For a description of scraping please refer to FIG. 14 described below and to commonly owned U.S. patent application Ser. No. 09/237,169 filed Jan. 25, 1999 and entitled WEB SCRAPING ENGINE, which is incorporated herein by reference. Once enough product information has been gathered to determine the SKU, the SKU information is then stored. In block 1340, information on the product is updated after successful scraping of a merchant server's Web site.

Processing continues in block 1315, a product key is generated to uniquely identifies the SKU of a product and the merchant associated with the product. The product key is required because different merchants may carry products of the same product type, which have the same SKU. Then in block 1320 a parent SKU is selected. A parent SKU is a SKU that defines the product in its basic form, for example "Levi's Jeans" a child SKU has modifiers to the parent SKU, for example "Blue, size 32 waist 34 length." So block 1320 normalizes the product information and breaks out the product attributes.

Once the SKU is normalized, we check in block 1325 to see if it is "static" (e.g. residing in our product database 470). If so, we proceed to block 1330 where a SKU object is determined, if not then a "Virtual SKU" is added to the product database 470 in block 1345 which may cache the SKU so that it can be accessed again. In some embodiments the caches SKU either goes away at some point or in other embodiments the SKU becomes a "static" SKU and is added to the product database 470 as a static SKU. Processing then ends in block 1399 where a SKU object is returned to the calling routine.

As will be appreciated by those of ordinary skill in the art, the SKU and product information may be stored in many different locations. For example, the SKU and product information could be stored on other remote computers.

Figure 14:
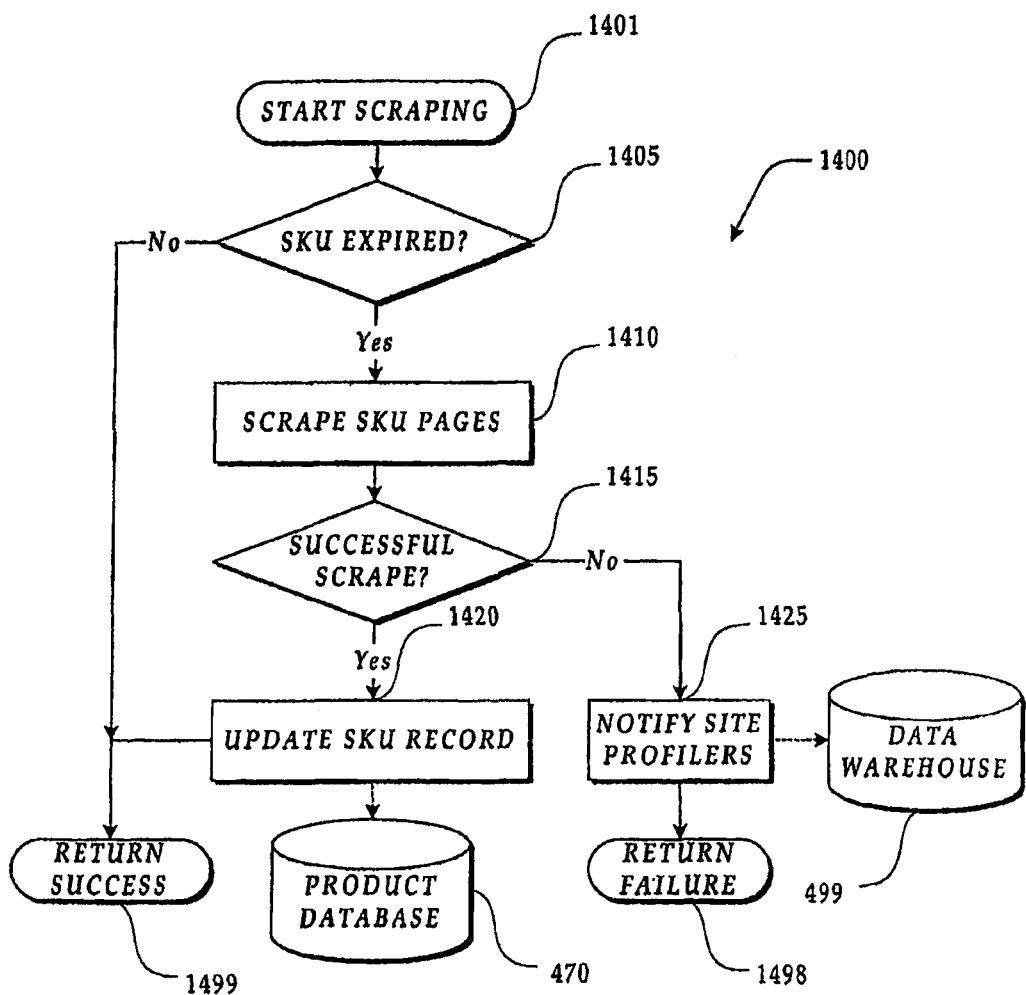
FIG. 14 is a flow chart illustrating scraping information on a product to add to aUSC.

FIG. 14 is a flow diagram illustrating a routine 1400 for scraping a Web site with reference to a particular SKU. Routine 1400 starts at block 1401 and proceeds to decision block 1405 that checks if the SKU has expired. If the SKU has not expired, then routine 1400 returns a success at block 1499. Otherwise, if the SKU has expired then routine continues to block 1410 where the SKU Web pages are scraped to update information on the SKU. If the scrape was successful (i.e., the product information was retrieved) then the SKU's record is updated in block 1420 in the product database 470. If the scrape was unsuccessful then routine proceeds to block 1425 where the site profiler (either an autonomous profiling program or an administrator for the e-commerce server) is notified that information is unavailable and a record of the failed scrape is logged to the data warehouse 499. Routine 1400 then returns a failure at block 1498.

Figure 16:
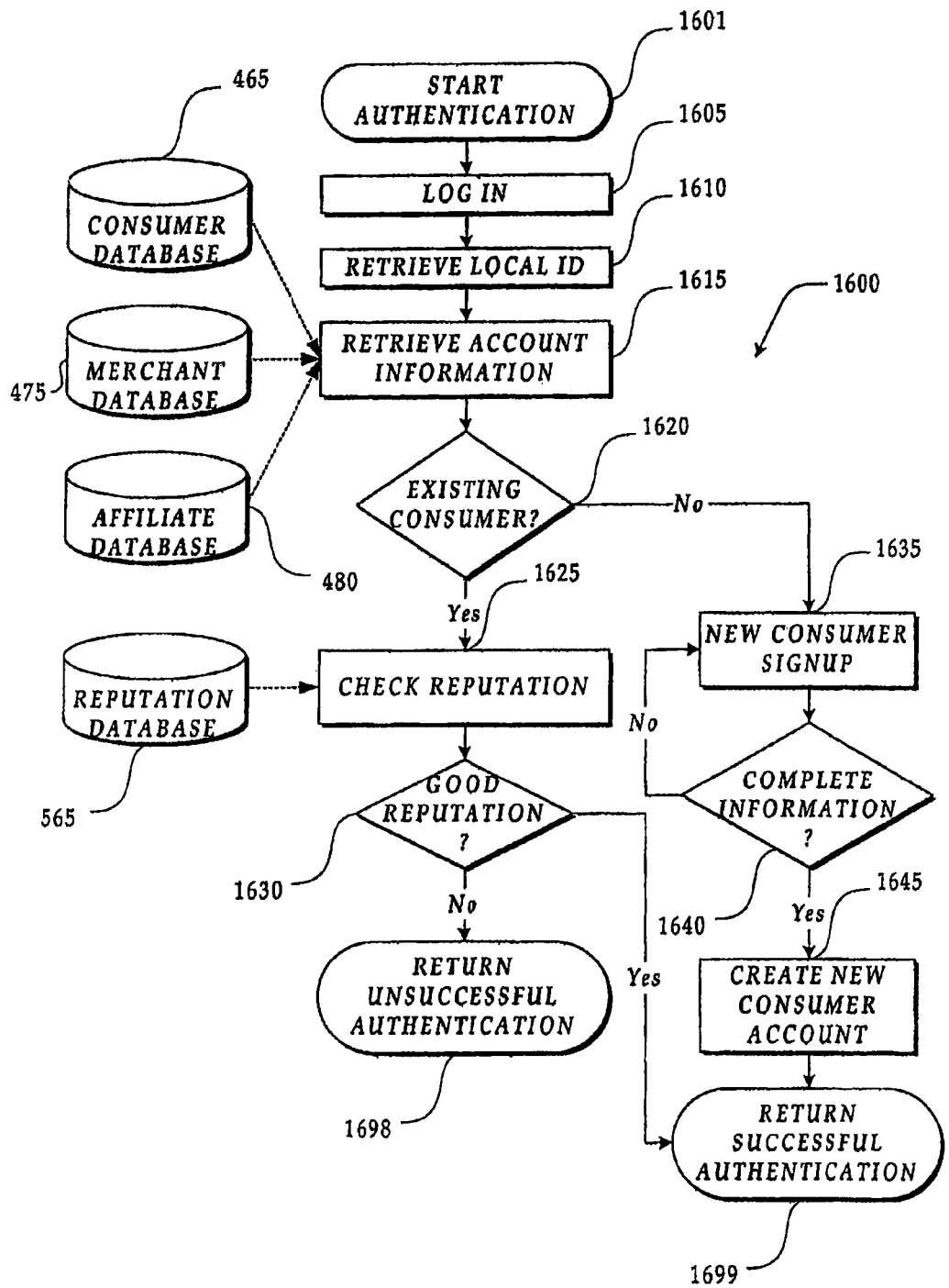
FIG. 16 is a flow chart illustrating user authentication.

As discussed above with respect to FIGS. 7, 8 and 15, before a consumer can complete a purchase they must authenticate themselves. Additionally, for a merchant to initiate an interaction with the e-commerce server they too must authenticate themselves. FIG. 16 is a flow diagram illustrating a routine 1600 for authenticating either a consumer or a merchant. For purposes of FIG. 16, a "user" may be either a merchant or a consumer. In one embodiment of the invention, the routine starts at block 1601 and at block 1605, the user is requested to login to the system by specifying identifying information such as a username and password in a Web page 1500 such as that shown in FIG. 15. At block 1610, the local user's ID is retrieved from the user interface, such as a Web page. The local ID and ID information are combined in block 1615 and used to retrieve account information from the consumer database 465, merchant database 475 and affiliate database 480. At decision block 1620 a determination is made as to whether an account already exists for this user. If the account is not found, the consumer is asked to sign up for a new account in block 1635. In one embodiment of the invention, a new account is created by requesting the user to enter a unique identifier and password into a form on a Web page maintained by the e-commerce server 400. Once the user has entered a unique identifier and password, decision block 1640 determines if the information entered is unique and complete. If the information is unique and complete a new account is created for the user and routine 1600 ends with a successful authentication in block 1699. Otherwise, the new user is returned to the new user sign up screen in block 1635 to select a different user name/ID, password or both. Blocks 1635-1640 are repeated until the information entered by the user is unique and complete. If the consumer already established an account, as determined by decision block 1620, the consumer information or merchant information, is run through a reputation server 500 in block 1625 by retrieving the consumer's reputation from the reputation database 565. At decision block 1630, a determination is made as to whether the consumer or merchant is in good standing with the reputation server 500. If the consumer or merchant is in good standing, the authentication passes as indicated by block 1699, otherwise the authentication fails in block 1698 and the consumer or merchant is not allowed to proceed in the shopping process. As will be appreciated by those of ordinary skill in the art, many different authentication processes may be used.

Figure 17:
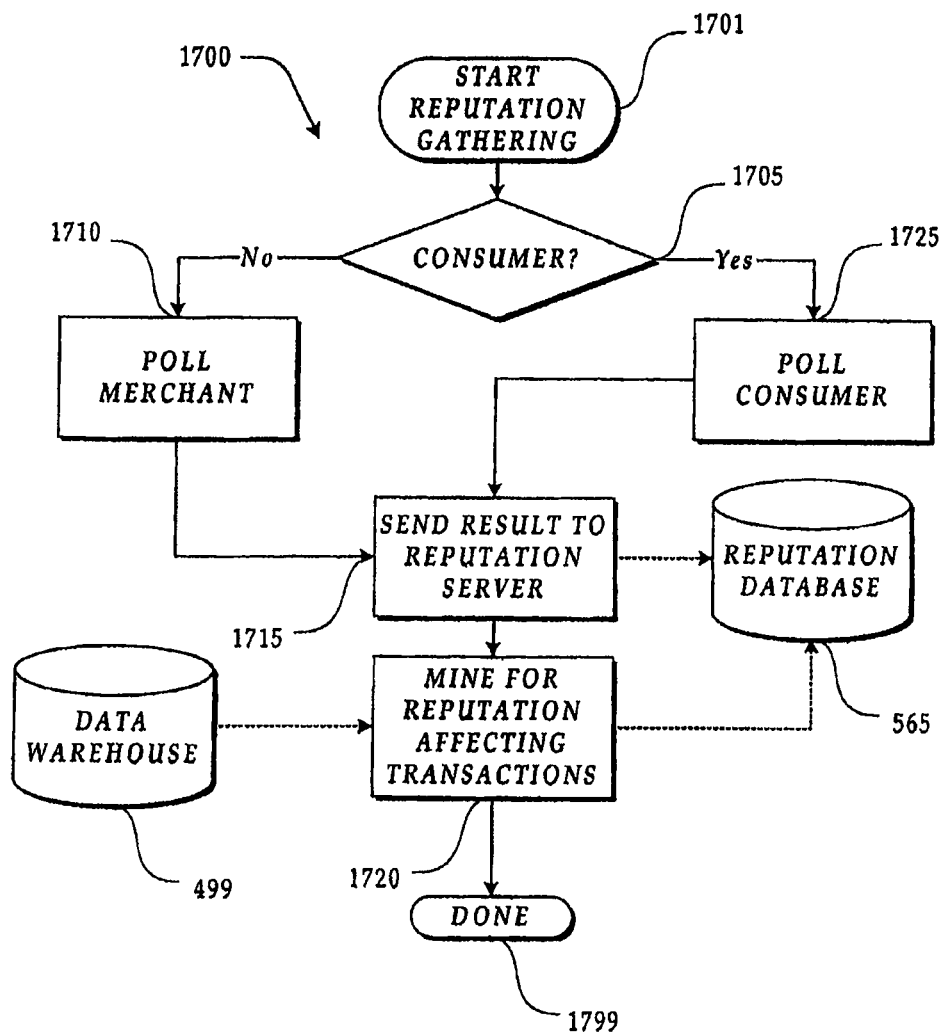
FIG. 17 is a flow chart illustrating reputation gathering by a reputation server.

FIG. 17 is a flow chart 1700 illustrating reputation gathering for a reputation server 500. As noted above, the reputation server 500 is a tool used by the consumer and merchant in order to selectively identify merchants and/or consumers with whom they desire to transact business. The process begins in a block 1701 and proceeds to a decision block 1705 where a determination is made as to whether the entity is a consumer or merchant.

If the person is a merchant, polling information is requested of the merchant as to the experience with a particular consumer in block 1710. For example, the merchant may be polled on information such as overall experience with the consumer, did the consumer pay on time, did the consumer return the product, did the consumer complain, etc., and the like. In one embodiment of the invention, the polling information is presented to the merchant as a form on an HTML Web page provided by the e-commerce server 400. As will be appreciated by those of ordinary skill in the art, polling information may be obtained in many different ways. If the person is a consumer, polling information is requested of the consumer as to the experience with a particular merchant in block 1725. For example, the consumer may be polled on information such as overall experience with the merchant, price of the merchant, shipping costs of the merchant, and the like. In one embodiment of the invention, the polling information is presented to the consumer as a form on an HTML Web page provided by the e-commerce server 400. As will be appreciated by those of ordinary skill in the art polling information may be obtained in many different ways. For example, the polling information could be collected via a phone interview with the consumer or merchant, or could be collected through an e-mail questionnaire.

Once the polling information is provided, in either block 1710 or block 1725, the information is added to the reputation server in block 1715. Then in block 1720 the data warehouse 499 is further mined for automated reputation influencing information for stored transactions by the merchant and/or consumer. Reputation influencing information may include such things as whether the merchant shipped the product within the time they promised, or whether the price paid to the merchant was more or less that was originally offered. On the consumer side, reputation influencing information might include such things as whether a consumer failed to pay a bill, or whether they provided false information. In one embodiment of the invention, the polling data for the reputation server 500 is stored in a reputation database 565 in the memory 550 of the reputation server 500. As will be appreciated by those of ordinary skill in the art, reputation databases 565 could be constructed many different ways. For example, the reputation database 565 could be a list of undesirable merchants or consumers stored in a text file. If the name of a merchant or consumer is contained within the text file, the consumer or merchant would not be approved by the reputation server 500. Routine 1700 ends in block 1799.

Figure 18:
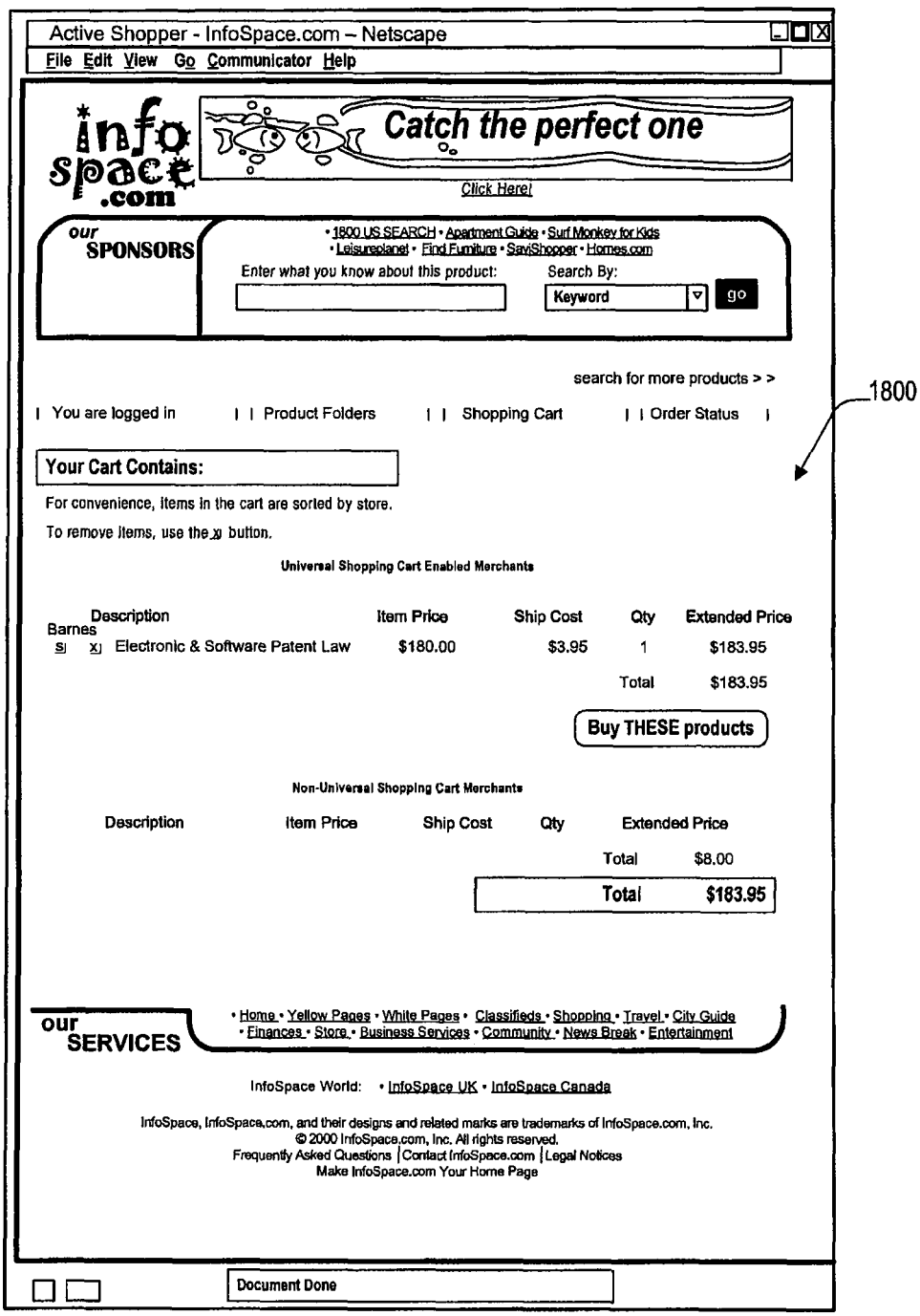
Figure 21:
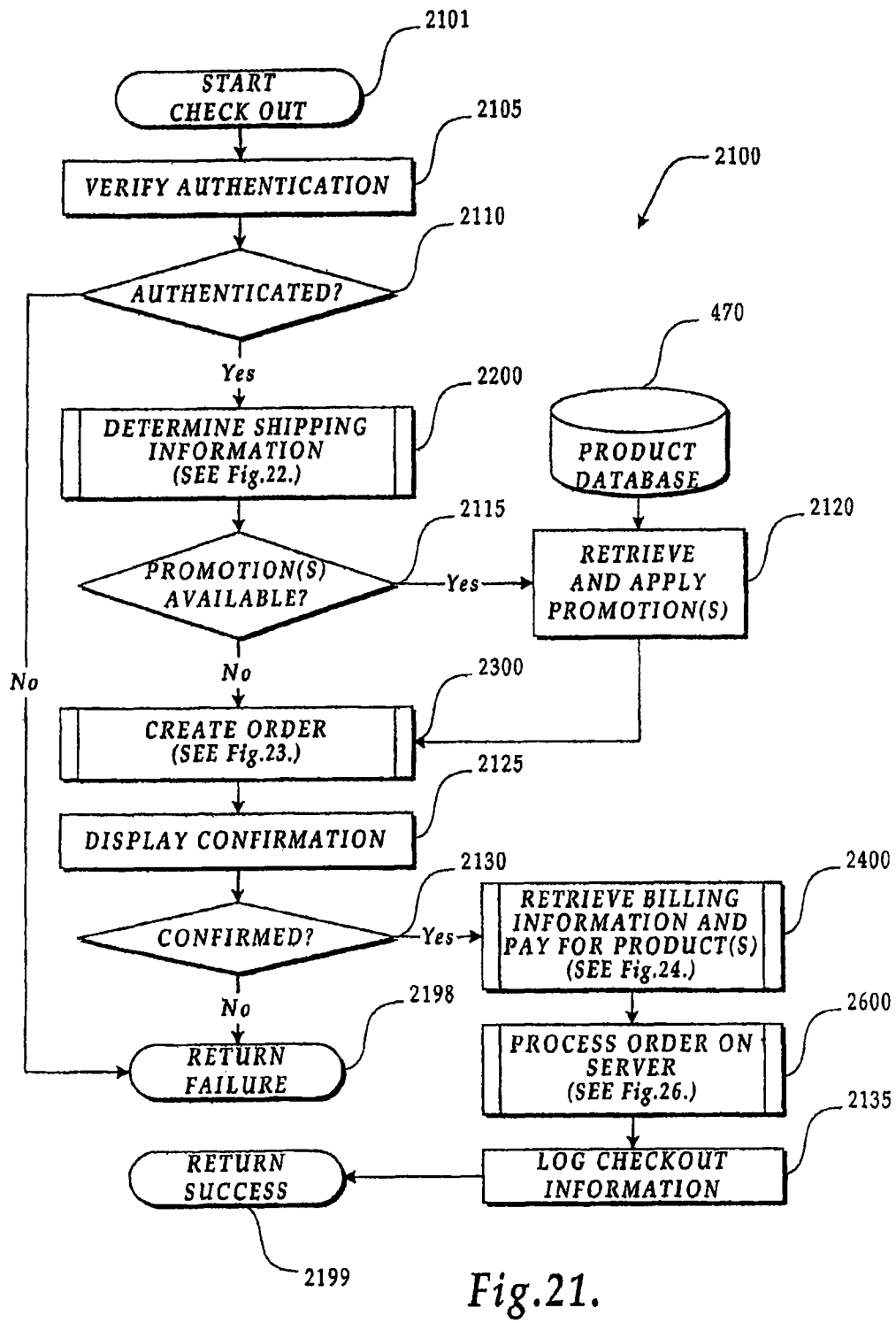
FIG. 21 is a flow chart illustrating a check out process for the USC.

FIG. 21 illustrates a flow chart 2100 for checking out from a shopping session using a USC as further illustrated in exemplary Web page 1800 shown in FIG. 18. Routine 2100 starts at block 2101 and proceeds to block 2105 where a consumer's authentication (from the login process in routine 1600) is verified. In decision block 2110 a determination is made whether the consumer is still authenticated (e.g., no session time-out or shutting down of the connection between logging in and checking out). If the consumer is no longer authenticated, then the routine ends at block 2198 returning a failure. Otherwise, for an authenticated consumer, processing continues to block 2200.

In one embodiment of the invention, shipping details for the products selected by the consumer and present in the cart are defined in a block 2200 (see FIG. 22 and description below). After determining the shipping details, decision block 2115 determines if there are any price incentives or promotions for the products to be ordered. In one embodiment of the invention, the price incentives are stored in the product database 470. If there are price incentives, the price incentives are retrieved and applied to the affected products in block 2120. Pricing information and details are then collected and calculated as indicated by block 2300 (see FIG. 23 and description below). Total pricing information including shipping and taxes is then shown to the consumer for purchase confirmation in block 2125. Decision block 2130 illustrates that the consumer may decide whether to accept the total. If the consumer does not accept the confirmation, then the check-out fails and a failure is returned in block 2198. Otherwise, if the consumer accepts the total, then the billing and prepayment process for the products begins (see FIG. 24 and description below). In one embodiment of the invention, the order is in the form of an XML string. The XML string contains merchant IDs, consumer address, consumer name, product information (quantity, price, attributes, and the like), shipping information, and billing information. An exemplary XML document might look like:

```
1 <?xml version="1.0"?> <order id="[#]" date="[M/d/yyyy h:mm:ss a]"
currency="1" subtotal="[$]" shippingcosts="[$]" tax1total="[$]"
tax2total="[$]" tax3total="[$]" tax4total="[$]" grandtotal="[$]">
<merchant id="[#]"/> <purchasedata> <authentication> <login>[Login
to be used during purchase or empty tag.]</login>
<password>[Password to be used during purchase or empty
tag.]</password> </authentication> <shipto> <name>
<prefix>["Dr.".vertline."Mr.".vertline."Mrs.".vertline."Ms."]</p- refix>
<first>[First name of line items receiver.]</first> <last>[Last name of
line items receiver.]</last> </name> <company>[Receiver's company
name or empty tag.]</company> <address1>[Receiver's
address.]</address1> <address2>[Additional address info or empty
tag.]</address2> <city>[Receiver's city name.]</city>
<state>[Receiver's state in 2-letter US postal code format]</state>
<zip>[Receiver's 5-digit US zip code.]</zip> <country>US</country>
<phone> <areacode>[Receiver's 3-digit area code.]</areacode>
<exchange>[First three digits of receiver's phone
number.]</exchange> <number>[Last four digits of receiver's phone
number.]</number> <extension>[Receiver's phone extension or
empty tag.]</extension> </phone> <email> <user>[Username portion
of receiver's e-mail address.]</user> <host>[Hostname portion of
receiver's e-mail address.]</host> </email> </shipto> <billto> <name>
<prefix>["Dr.".vertline."Mr.".vertline."Mrs.".vertline."Ms."]</p- refix>
</first>[First name of line items buyer.]</first> <last>[Last name of line
items buyer.]</last> </name> <company>[Buyer's company name or
empty tag.]</company> <address1>[Buyer's address.]</address1>
<address2>[Additional address info or empty tag.]</address2>
<city>[Buyer's city name.]</city> <state>[Buyer's state in 2-letter US
postal code format]</state> <zip>[Buyer's 5-digit US zip code.]</zip>
<country>US</country> <phone> <areacode>[Buyer's 3-digit area
code.]</areacode> <exchange>[First three digits of buyer's phone
number.]</exchange> <number>[Last four digits of buyer's phone
number.]</number> <extension>[Buyer's phone extension or empty
tag.]</extension> </phone> <email> <user>[Username portion of
buyer's e-mail address.]</user> <host>[Hostname portion of buyer's
e-mail address.]</host> </email> </billto> <shippingpreference
id="[#]"> ["Overnight Delivery".vertline."2nd Day
Air".vertline."Standard"] </shippingpreference> <payment>
<paymenttype id=[#]"> [American Express".vertline."Carte
Blanche".vertline."Diner's Club" .vertline."Discover".vertline."J-
CB".vertline."Master Card".vertline."Visa"] </paymenttype>
<cardholdername> </first>[First name of credit card holder.]</first>
<last>[Last name of credit card holder.]</last> </cardholdername>
<creditcardnumber> </firstgroup>[First four digits of credit card
number.]</firstgroup> <secondgroup>[Secon- d four digits of credit
card number.]</secondgroup> <thirdgroup>[Third four digits of credit
card number.]</thirdgroup> </fourthgroup>[Fourth four digits of credit
card number.]</fourthgroup> </creditcardnumber>
<securitycode>[Credit card's 3-digit security code or empty
tag.]</securitycode> <expiryyear>["2000"-"2010"]</expiryyear>
<expirymonth>["01"-"12"]</expirymonth> </payment>
</purchasedata> <lineitemlist> <lineitem id="[#]" sku="[#]"
quantity="[#]" listprice="[$]" saleprice="[$]" linetotal="[$]"
associatedlineitemid="[#]"giftlineitemid="[#]"> <productname>[Human
readable product name.]</productname> <producturl>[Fully specified
URL of product page.]</producturl> </lineitem> </lineitemlist>
</order>
```

As will be appreciated by those of ordinary skill in the art, the order could be formed in many different ways. For example, the order could be stored in a text file containing the necessary information. Information is necessary if it is required to place an order with the merchant. However, some merchants do not need all the information that may be requested from the consumer. For example, not all merchants require day and evening telephone numbers. Additionally, if the information can be created during the ordering process based on the information provided in the order, the information is not necessary. Once the order is created, the order is sent to be processed by the e-commerce server (see FIG. 26 and description below). Finally, the purchase transaction is logged to a data warehouse 499 in block 2135 and the check-out process returns a success in block 2199.

Figure 19:
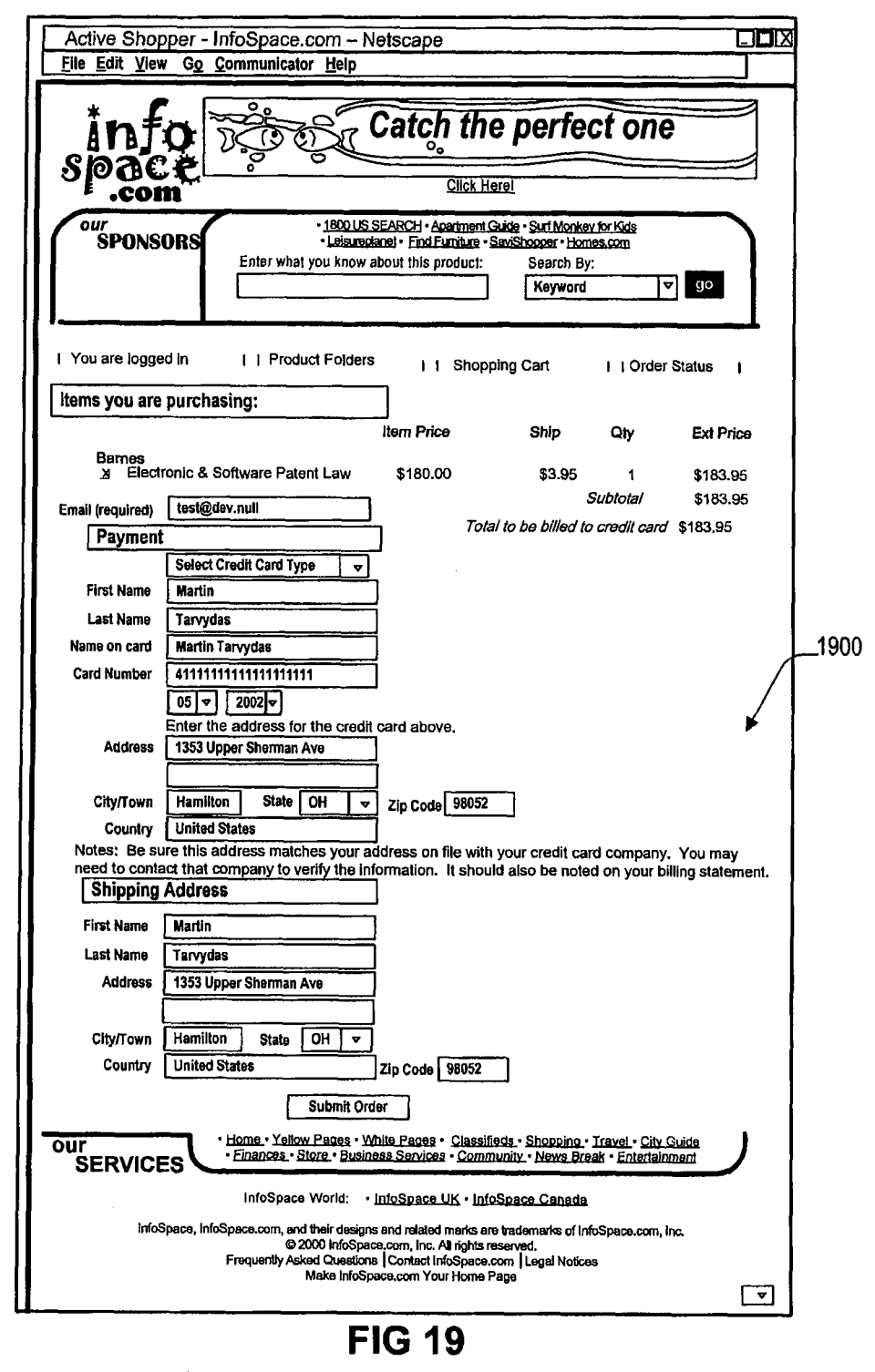
Figure 22:
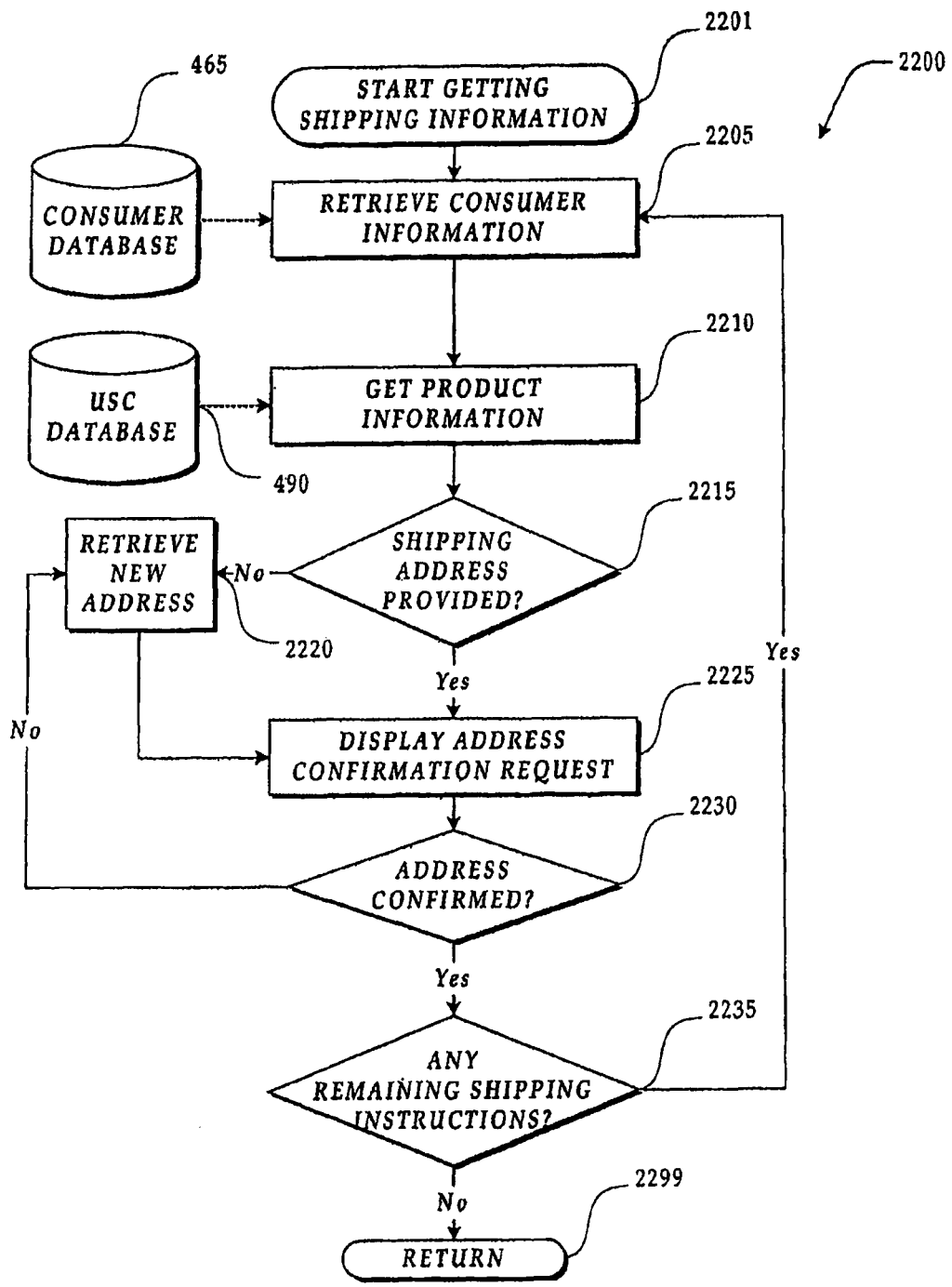
FIG. 22 is a flow chart illustrating defining shipping information.

FIG. 22 is a flow chart 2200 illustrating obtaining consumer information and obtaining shipping information from the consumer. In one embodiment of the invention, consumer information is retrieved from a database on the e-commerce server 400 in block 2205. The consumer information contains the consumer's name, addresses, billing information (if provided), and the like. At block 2210, the product information from the consumer's USC is retrieved. If the consumer already has provided shipping information, then decision block 2215 proceeds directly to displaying an address confirmation at block 2225, otherwise a new address is retrieved in block 2220 as shown in exemplary Web page 1900 illustrated in FIG. 19.

In alternate embodiments, the present invention may allow for shipping different products from the same USC to multiple locations. Accordingly, the shipping method would be determined for each merchant and for each product going to a different address from the same merchant. For example, one merchant may exclusively use UPS to ship its products, while another merchant may use Priority Mail, Federal Express, UPS and the like to ship products. In one embodiment of the invention, the shipping methods are obtained by scraping a merchant's site. In another embodiment of the invention, the shipping methods are maintained by the e-commerce server 400 and the methods are stored in a database in the memory 450 of the e-commerce server. If the consumer wishes to ship some or all of the products to different addresses, block 2220 would be repeated for each new address.

Figure 20:
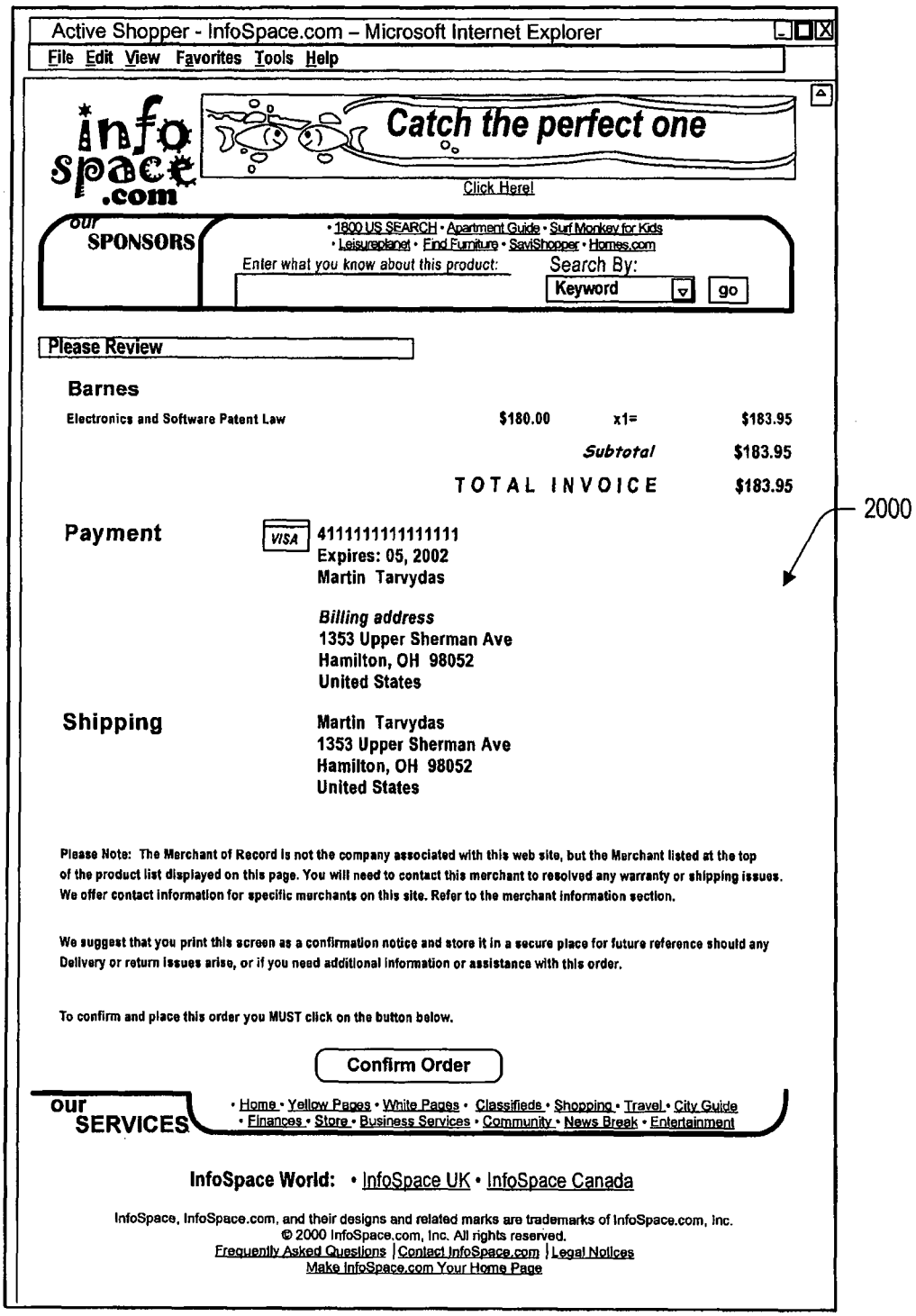

If an address (or addresses) was not confirmed as shown in exemplary Web page 2000 illustrated in FIG. 20, then decision block 2230 continues processing back at block 2220 where a new address is entered. Otherwise, decision block 2230 proceeds to decision block 2235, which checks for any remaining shipping instructions. If there are any shipping instructions, then the processing of routine 2200 continues back at block 2205 where consumer information is retrieved again. If no shipping instructions remain, then routine 2200 returns in block 2299.

Figure 23:
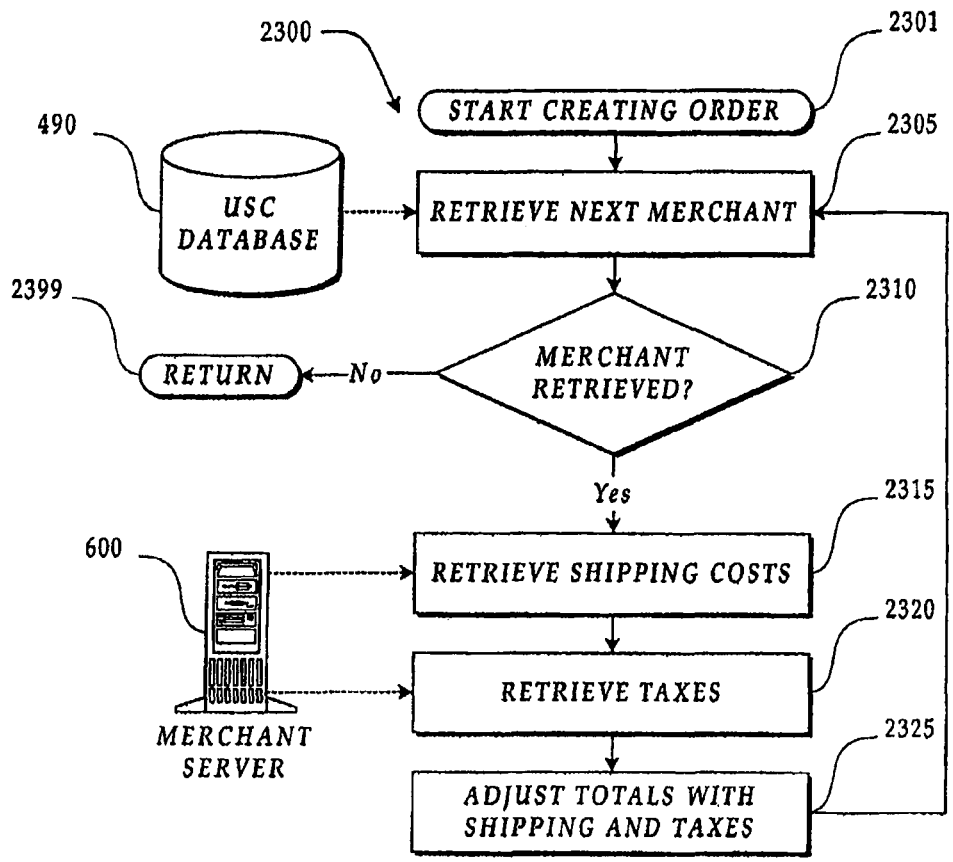
FIG. 23 is a flow chart illustrating the order creation process.

FIG. 23 is a flowchart of subroutine 2300 called by the check out routine 2100 for creating an order from a USC. Subroutine 2300 starts in block 2301 and retrieves a reference to a merchant that has their product(s) in the universal shipping cart in block 2305. If no merchant is retrieved then in decision block 2310 subroutine 2300 ends in block 2399. Otherwise, the shipping costs for the merchant's product(s) are retrieved from the merchant in block 2315. Then the taxes for the merchant's products are retrieved in block 2320. The taxes and shipping costs are added to a running total for the order in block 2325. The process then repeats itself for each merchant who has any product(s) in the consumer's USC.

Figure 24:
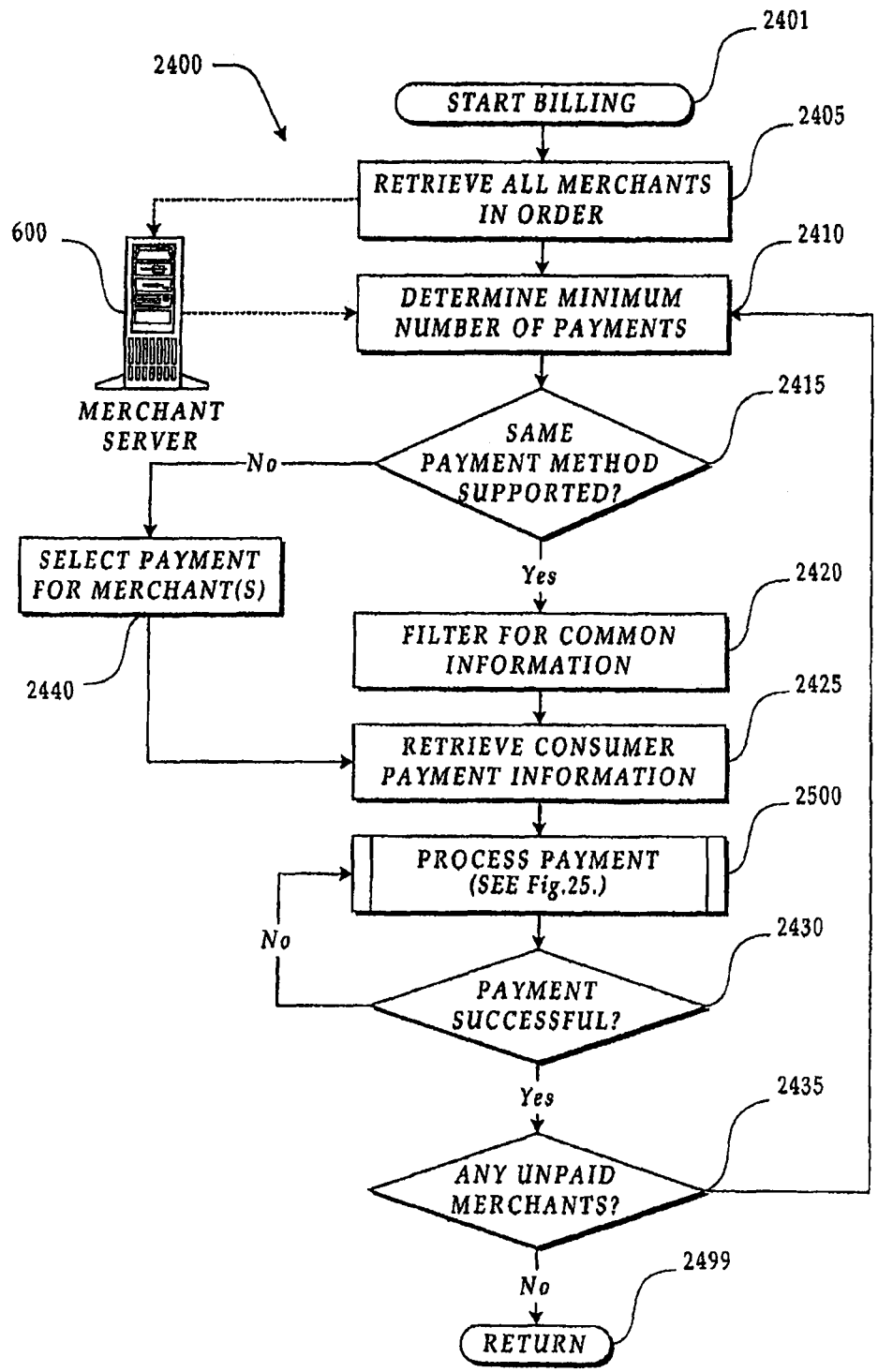
FIG. 24 is a flow chart illustrating defining billing information.

FIG. 24 is a flowchart 2400 illustrating a subroutine called by the check out routine 2100 for obtaining billing details. In one embodiment of the present invention, a determination is made in block 2405 as to how many products in the cart come from different merchants. Routine 2400 then determines in block 2410 the minimum number of payments that are needed to pay all the merchants for all of the products. Decision block 2415 determines the payment methods supported by each merchant. For example, a consumer may have ordered three books from Merchant A and five videos from Merchant B. Merchant A may accept two forms of payment while Merchant B may accept four different forms of payment. If the same payment method is supported then, the common payment methods among the merchants are determined and presented to the consumer through a Web page in block 2420. Otherwise payment method(s) are presented to the consumer and the consumer selects a form of payment for a merchant or possible group of merchants that will accept the same form of payment in block 2440. The consumer then provides any necessary payment information in block 2425. The payment is then processed by the payment subroutine 2500 (see FIG. 25 described below). Processing continues to decision block 2430. If decision block 2430 determines that the payment(s) were successful, then routine 2400 checks at decision block if any merchant(s) remain unpaid, if they do, then processing continues from block 2410. If all merchant(s) have been paid, then routine 2400 returns from processing at block 2499.

Figure 25:
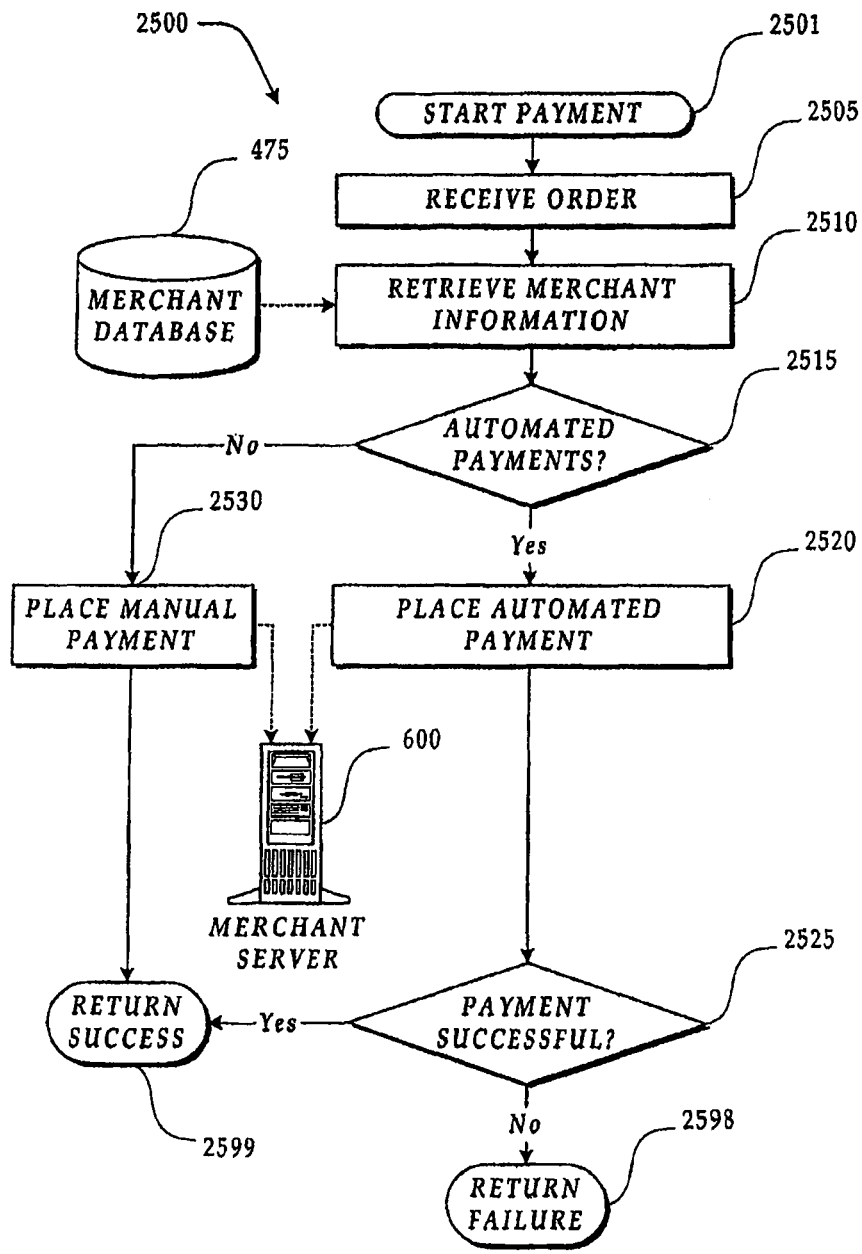
FIG. 25 is a flow chart illustrating the payment process.

FIG. 25 illustrates an exemplary payment routine 2500 formed in accordance with the present invention. Routine 2500 begins at block 2501 and proceeds to block 2505 where the current order is received. From block 2505 routine 2500 continues to block 2510 where the merchant information corresponding to the merchant selected to supply product(s) in the current order is retrieved from the merchant database 475. From block 2510 routine 2500 proceeds to decision block 2515 where the retrieved merchant information is examined to determine if the merchant supports automatic payments from the e-commerce server 400. If automatic payments are not supported, then convention manual payment systems are used in block 2530 to send payment to the appropriate merchant server and routine 2500 returns a success in block 2599. On the other hand, if decision block 2525 determines that automatic payments are supported, then an automatic payment is placed with the appropriate merchant server 600 in block 2520 and processing continues to decision block 2525. If the automatic payment is found to be successful then a success is returned in block 2599, otherwise processing continues to block 2598 and a failed payment is returned from routine 2500.

Figure 26:
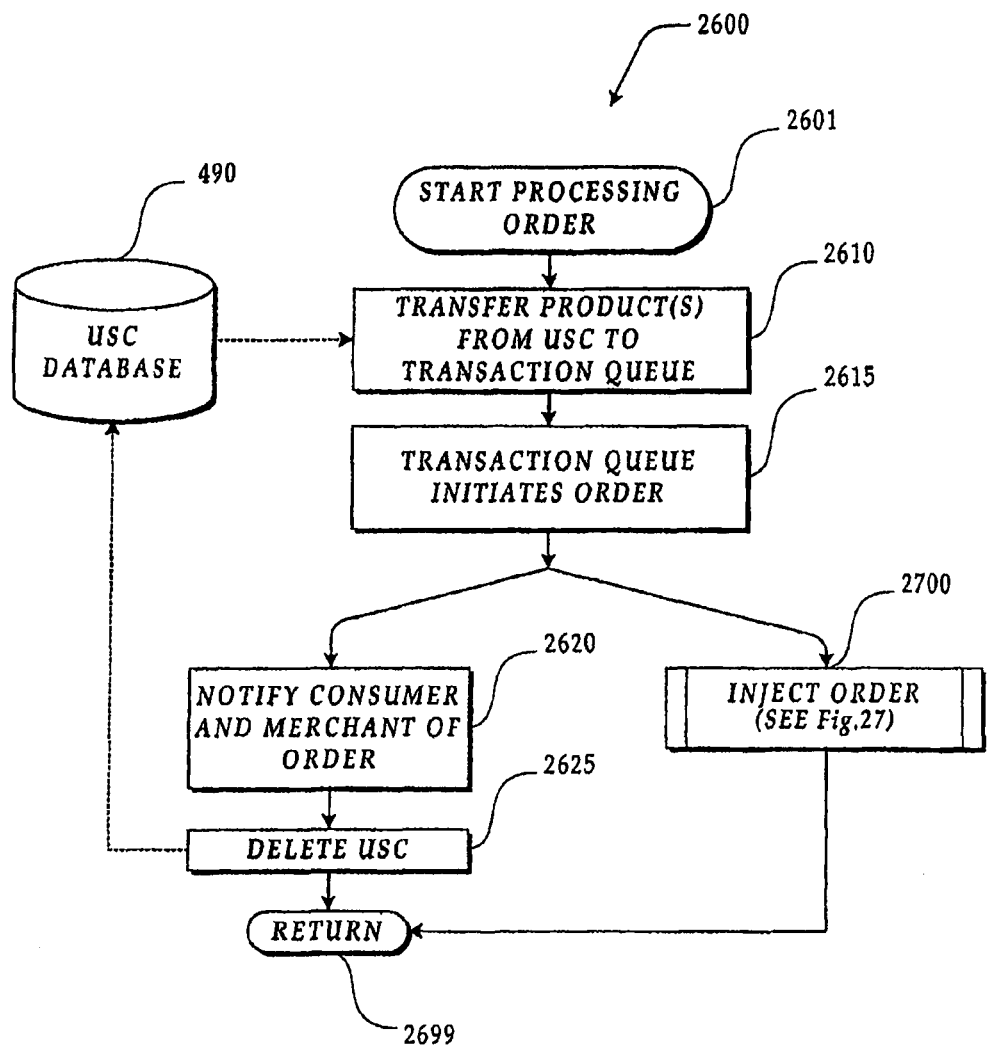
FIG. 26 is a flow chart illustrating the checkout process.

FIG. 26 illustrates the routine 2600 called by the check out routine 2100 for processing an order on the e-commerce server 400. Routine 2600 starts at block 2601 and proceeds to the block 2610 where the products from the USC are transferred to a transaction queue in the USC service 485. The transaction queue then initiates the ordering process in block 2615. The ordering process comprises two parts, one is sending the order to an order injection system subroutine 2700 (see FIG. 27 and description below) which places orders for products in the USC on a merchant servers' purchase service software 660. The other part of the ordering process includes notifying the consumer and merchant(s) in block 2620 and deleting the USC in block 2625, then routine 2600 returns at block 2699.

Figure 27:
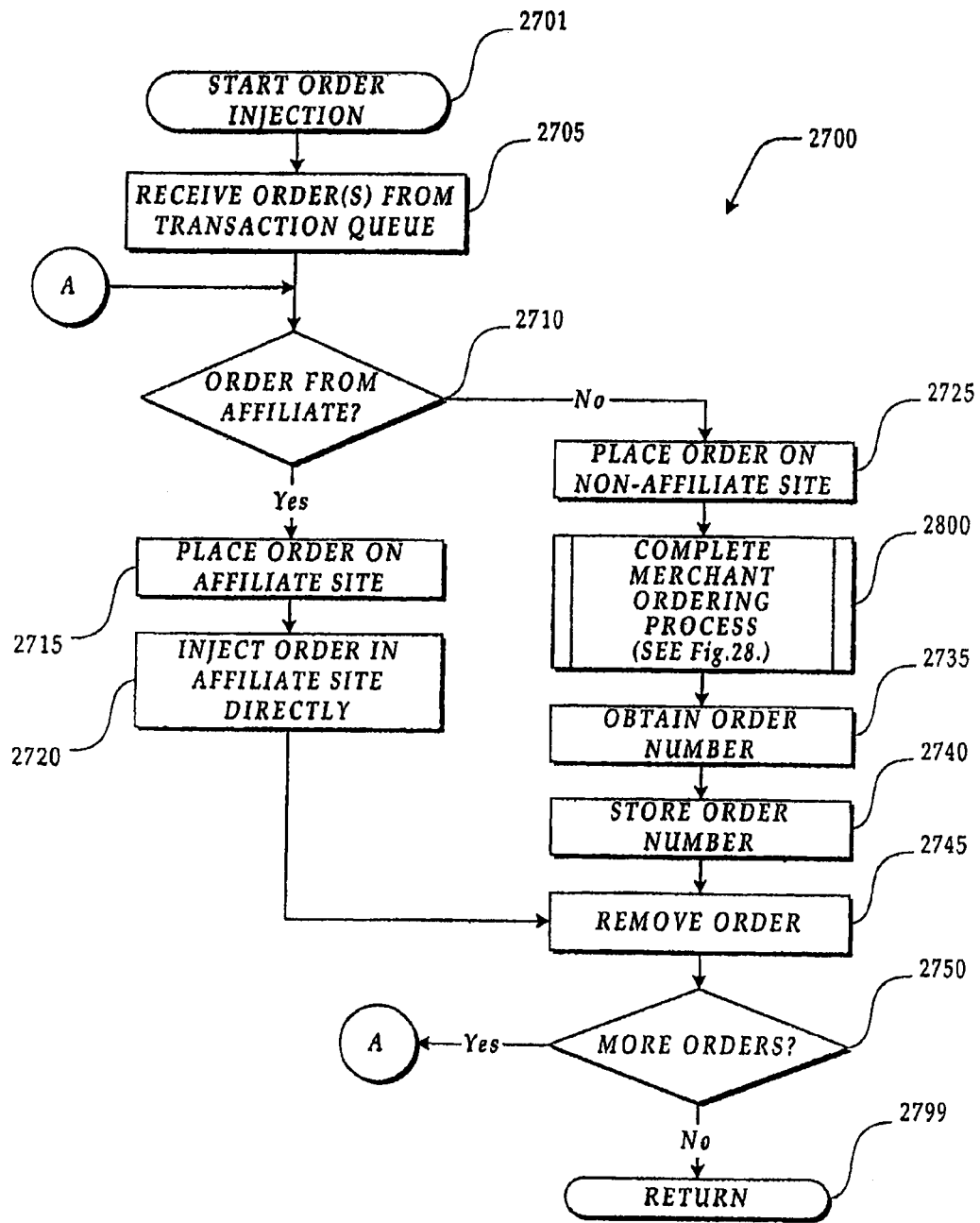
FIG. 27 is a flow chart illustrating an order injection process.

FIG. 27 is a flowchart illustrating a routine 2700 for sending an order to an order injection gateway. The order injection gateway is called for the USC and it runs in its own independent asynchronous process to inject the orders to the merchants servers. As indicated by block 2705 the order injection gateway receives the order from the transaction queue. In one embodiment of the invention the order string is parsed to determine the merchant ID for each product ordered, the list of products to order, the consumer data necessary to order the products, as well as shipping and billing information. The order injection gateway determines, at decision block 2710, as to whether or not the order is from an affiliate. If the order is from an affiliate, the order is sent directly to the affiliate in block 2715. Otherwise, the order is placed with the non-affiliated site in block 2725. In one embodiment of the invention, if the order is placed with a non-affiliated site the order injection system may have to log on to the non-affiliated site. Therefore, the order gateway automatically fills in the required information on the external merchant's site to create an account for the consumer. The required consumer information is obtained from the consumer account information. In one embodiment of the invention, the account information for the non-affiliated site is maintained by a database, and linked to the consumer's account information on the e-commerce server 400 for future use. Using the information obtained from the order injection process (see FIG. 28 and description below), the order injection gateway routine 2800 fills in the required forms to place the order with the merchant in block 2800. As will be appreciated by those of ordinary skill in the art, every site will require a different process to order goods. For example, some merchants may require that a consumer be registered, while others do not require registration. The order number is received in block 2735 and stored for future access by the consumer. In one embodiment of the invention, the order number is stored along with the consumer's account information on the e-commerce server 400 in block 2740. Routine 2700 continues to block 2745 where the injected order is removed from consideration. Then at decision block 2750 routine 2700 checks for any remaining orders. If any orders remain, processing branches back to decision block 2710. If no orders remain, then routine 2700 returns from processing at block 2799. Referring back to decision block 2710, if the order is from an affiliate site, then processing in routine 2700 continues to block 2715 where the order is placed on the affiliate site (block 2715) and injected directly in affiliate site (block 2720). After which routine 2700 proceeds to block 2745 as described above.

Figure 28:
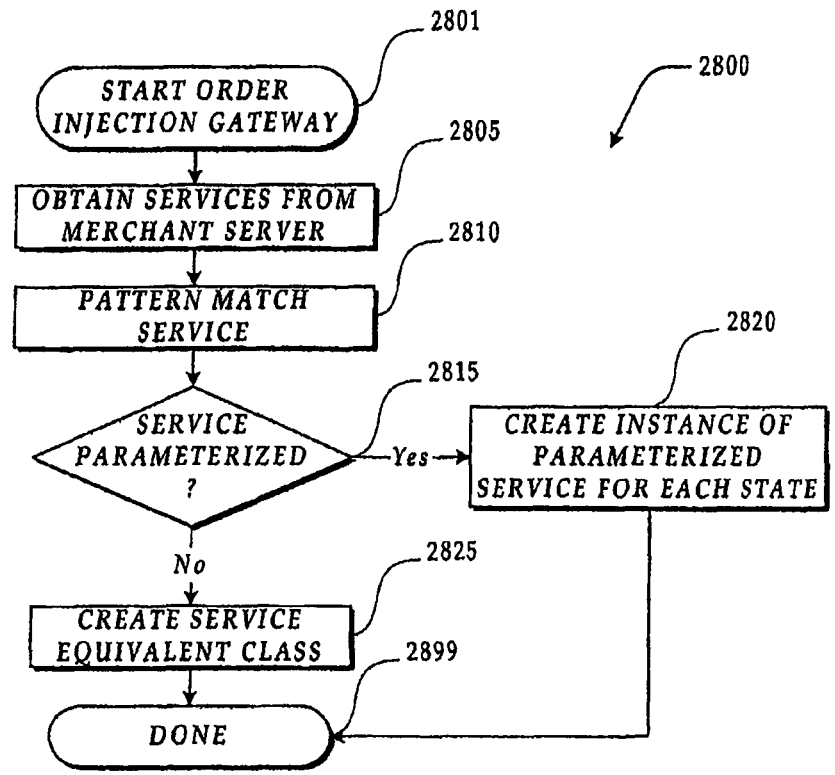
FIG. 28 is a flow chart illustrating an order injection gateway process.

FIG. 28 is a flowchart 2800 illustrating the order injection gateway process. The order injection gateway process may be repeated each time a there is an injection into a merchant's site. In essence, this will determine if the merchant has changed the site since the last time the injector built a parameterized script for the merchant's site. At block 2805, services are obtained from the non-affiliated merchants. A service is any string, link, button, form, and the like contained on a Web page. In one embodiment of the invention, several instances of the same page are obtained from the external merchant using different accounts. For example, a copy of each page on a merchant's site is stored using different account information. Pattern matching (such as by using a regular expression parser) is then performed on the services to look for common characteristics of the service in block 2810. Such common characteristics might include such characteristics as naming conventions, for example, HTML tags like FNAME or FIRST_NAME that are then determined to mean the same thing. Then by observing the HTML text surrounding the fields to find information such as "SHIPPING ADDRESS" or "BILLING ADDRESS" it is possible to combine those elements (tags and text) to understand that the merchant's site wants the first name of the shopper's billing information as opposed to the first name of the shipping information. In one embodiment, the pattern matching is performed manually. In another embodiment, the pattern matching is performed using genetic algorithms. As will be appreciated by those of ordinary skill in the art, many different pattern matching techniques could be implemented. For example, string compares could be used looking for common occurrences of all strings. After pattern matching has been performed, decision block 2815 determines if the service is parameterized. A parameterized service is a service that allows for a consumer action. For example, a button and a fillable form are parameterized services. If the service is parameterized, an parameterized service is created for each state in block 2820. For example a section of a form could be considered a state, such as Billing Address, or Shipping Address. The current state changes once the exit criteria is completed (e.g., all the mandatory info for billing Address state has been filled). In another example, a drop down menu will have as many states as there are buttons. Based on the previously obtained information, the process creates service equivalence classes in block 2825. The service equivalence class is a class having the essential details required to navigate the non-affiliated merchant's site. Again using the Billing Address as an example, the service equivalence classes are all the elements that properties and methods need to complete the Billing Address as an object or service class. For example, The billing object may need a code to break the phone number up into three fields. As will be appreciated by those of ordinary skill in the art, these services must be updated occasionally or they may no longer work. For example, if a merchant's site changes significantly, the automated ordering system will not be able to traverse the site. In one embodiment of the invention, this is done manually. In another embodiment of the invention, a Web crawler or spider, is used to retrieve pages on a regular basis to compare with the list of current services. Routine 2800 ends at block 2899.

The embodiments of the present invention have been described in the consumer-merchant context in which the consumer orders products from merchants. The present invention can also be applied to a business-to-business e-commerce context to allow a buyer company to solicit bids from various supplier companies. In the past, the buyer company must initiate the bidding process with suppliers according to pre-existing protocols, and the protocols may be different for each supplier company.

According to the present invention, a bidding site is provided to allow a buyer to solicit bids using a consistent user interface. For example, a buyer company may wish to purchase memory chips of a certain memory size and speed. The bidding site scrapes the supplier sites to obtain information on what types of memory chips are available, and the price ranges of the memory chips for orders of different quantities and different delivery schemes. The buyer company views the information, and selects the supplier companies and types of memory chips that it wishes to receive bids. The supplier companies and memory chip types are put in a USC. After the selections, the buyer company checks out the USC, and the bidding site injects bid solicitations to the selected supplier companies to solicit bids for the selected products. Bid solicitations may include information on the specifications of the products requested, and the required quantities and approximate delivery dates of the products. In response, the supplier sites generate bids according to the bid solicitations, and the bids are displayed to the buyer company via the bidding site using a consistent user interface. The buyer company can then decide whether to accept the bids.

While the preferred embodiment of the invention has been illustrated and described, it will be appreciated that various changes can be made therein without departing from the spirit and scope of the invention.

The invention claimed is:

1. A method, implemented by a computer device, comprising:
   receiving, by a computer device, product information inputted by a plurality of merchants, wherein at least one of the plurality of merchants is a non-affiliated merchant;
   providing, by the computer device, a universal shopping cart link for retrieving a universal shopping cart;
   providing, by the computer device, a product selection link for a product selection to the universal shopping cart;
   determining, by the computer device, that an order for a product associated with the product selection is from the non-affiliated merchant rather than an affiliated merchant;
   in response to determining that the order for the product associated with the product selection is from the non-affiliated merchant:
      logging, by the computer device, on to a non-affiliated site associated with the non-affiliated merchant to create a customer account,
      transmitting, by the computer device, a product order associated with the selected product to the non-affiliated merchant, and
      injecting, by the computer device, the product order to the non-affiliated merchant without directing a user to the non-affiliated site; and
   providing, by the computer device, a universal shopping cart checkout link without directing a customer to the non-affiliated site.

2. The method of claim 1, wherein the providing the universal shopping cart link comprises determining that an existing universal shopping cart is associated with the customer; and creating a new universal shopping cart in response to no existing universal shopping cart being associated with the customer.

3. The method of claim 1, further comprising authenticating an identity of the customer, and exiting a product order process in response to non-authentication of the identity of the customer.

4. The method of claim 1, further comprising:
retrieving, by the computer-based system, reputation information associated with the customer from a reputation database; and
sending, by the computer-based system, the reputation information to at least one selected merchant.

5. The method of claim 4, wherein the reputation information associated with the customer is gathered by polling an experience of a merchant with the customer.

6. The method of claim 1, further comprising authenticating, by the computer-based system, an identity of the non-affiliated merchant associated with the selected product.

7. The method of claim 1, further comprising retrieving reputation information on the non-affiliated merchant associated with the selected product from a reputation database.

8. The method of claim 7, wherein the reputation database information is gathered by the customer on their experience with the non-affiliated merchant.

9. The method of claim 1, further comprising at least one of displaying product information and adding at least one product selected by the customer to the universal shopping cart in response to a check out command not being received from the customer.

10. The method of claim 1, further comprising generating a product key which uniquely identifies each of the selected products and the non-affiliated merchant associated with the selected product.

11. The method of claim 1, further comprising:
determining at least one common payment process supported by the non-affiliated merchant associated with the selected product; and
transmitting the at least one common payment process to the non-affiliate, merchant associated with the selected product.

12. The method of claim 1, further comprising scraping the non-affiliated merchant site to obtain product information.

13. The method of claim 1, wherein the product information includes information on a plurality of products of a same product type sold by the plurality of merchants to allow the customer to view the product information and compare the products of the same product type sold by different merchants using the user interface.

14. The method of claim 1, wherein the universal shopping cart is retrieved from a universal shopping cart database that includes customer information and information on previously saved product items.

15. The method of claim 1, wherein the computer-based system is populated with the product information by the non-affiliated merchant.

16. The method of claim 1, wherein the computer-based system is populated with the product information by a product manufacturer.

17. The method of claim 1, wherein the computer-based system is further configured to request the product information to be transmitted from a merchant of the plurality of merchants across a network.

18. The method of claim 1, wherein the computer-based system is further configured to receive the product information transmitted from a merchant of the plurality of merchants across a network.

19. A non-transitory computer-readable medium storing executable instructions that, when executed, cause a computer device to perform operations comprising:
receiving product information inputted by a plurality of merchants, wherein at least one of the plurality of merchants is a non-affiliated merchant;
providing a universal shopping cart link for retrieving a universal shopping cart;
providing a product selection link for a product selection to the universal shopping cart;
determining that an order for a product associated with the product selection is from a non-affiliated merchant rather than an affiliated merchant;
in response to determining that the order for the product associated with the product selection is from the non-affiliated merchant:
logging on to a non-affiliated site associated with the non-affiliated merchant to create a customer account,
transmitting a product order associated with the selected product to the non-affiliated merchant, and
injecting the product order to the non-affiliated merchant without directing a user to the non-affiliated site; and
providing a universal shopping cart checkout link without directing a customer to the non-affiliated site.

* * * * *